United States Patent
Jones et al.

(10) Patent No.: US 8,463,438 B2
(45) Date of Patent: Jun. 11, 2013

(54) METHOD AND SYSTEM FOR MULTI-MODE COVERAGE FOR AN AUTONOMOUS ROBOT

(75) Inventors: Joseph L. Jones, Acton, MA (US); Philip R. Mass, Denver, CO (US)

(73) Assignee: iRobot Corporation, Bedford, MA (US)

( * ) Notice: Subject to any disclaimer, the term of this patent is extended or adjusted under 35 U.S.C. 154(b) by 80 days.

(21) Appl. No.: 12/609,124

(22) Filed: Oct. 30, 2009

(65) Prior Publication Data
US 2010/0049365 A1    Feb. 25, 2010

Related U.S. Application Data

(63) Continuation of application No. 11/671,305, filed on Feb. 5, 2007, which is a continuation of application No. 10/839,374, filed on May 5, 2004, now Pat. No. 7,173,391, which is a continuation of application No. 10/167,851, filed on Jun. 12, 2002, now Pat. No. 6,809,490.

(60) Provisional application No. 60/297,718, filed on Jun. 12, 2001.

(51) Int. Cl.
*G05B 19/19* (2006.01)
*A47L 11/00* (2006.01)
*G06F 19/00* (2011.01)

(52) U.S. Cl.
USPC ......... 700/253; 700/258; 15/319; 318/568.12

(58) Field of Classification Search
USPC .............. 701/23, 50; 700/245, 253, 255, 258; 340/438; 318/568.12, 586.16, 568.17, 568.21, 318/538.12, 568.16; 901/1, 46; 15/318, 319
See application file for complete search history.

(56) References Cited

U.S. PATENT DOCUMENTS

| | | | |
|---|---|---|---|
| 1,755,054 | A | 4/1930 | Darst |
| 1,780,221 | A | 11/1930 | Buchmann |
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |

(Continued)

FOREIGN PATENT DOCUMENTS

| | | |
|---|---|---|
| AU | 2003275566 A1 | 6/2004 |
| AU | 2003275566 A1 | 6/2004 |

(Continued)

OTHER PUBLICATIONS

Braunsting et al. "Fuzzy Logic Wall Following of a Mobile Robot Based on the Concept of General Perception" Sep. 1995, ICAR 95, $7^{th}$ Itn'l Con on Advanced Robotics pp. 367-376.

(Continued)

*Primary Examiner* — Christine Behncke
(74) *Attorney, Agent, or Firm* — Fish & Richardson P.C.

(57) ABSTRACT

A control system for a mobile robot (10) is provided to effectively cover a given area by operating in a plurality of modes, including an obstacle following mode (51) and a random bounce mode (49). In other embodiments, spot coverage, such as spiraling (45), or other modes are also used to increase effectiveness. In addition, a behavior based architecture is used to implement the control system, and various escape behaviors are used to ensure full coverage.

16 Claims, 16 Drawing Sheets

U.S. PATENT DOCUMENTS

| | | |
|---|---|---|
| 2,770,825 A | 11/1956 | Pullen |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | De Brey |
| 3,678,882 A | 7/1972 | Kinsella |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A * | 6/1987 | Okumura ........................ 701/25 |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,710,020 A | 12/1987 | Maddox et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,912,643 A | 3/1990 | Beirne |
| 4,913,441 A | 4/1990 | Bohman |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A * | 10/1990 | Pong et al. ........................ 701/23 |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |

| | | | | | | |
|---|---|---|---|---|---|---|
| 5,070,567 | A | 12/1991 | Holland | 5,465,619 | A | 11/1995 | Sotack et al. |
| 5,084,934 | A | 2/1992 | Lessig et al. | 5,467,273 | A | 11/1995 | Faibish et al. |
| 5,086,535 | A | 2/1992 | Grossmeyer et al. | 5,471,560 | A | 11/1995 | Allard et al. |
| 5,090,321 | A | 2/1992 | Abouav | 5,491,670 | A | 2/1996 | Weber |
| 5,093,955 | A | 3/1992 | Blehert et al. | 5,497,529 | A | 3/1996 | Boesi |
| 5,094,311 | A | 3/1992 | Akeel | 5,498,948 | A | 3/1996 | Bruni et al. |
| 5,105,502 | A | 4/1992 | Takashima | 5,502,638 | A | 3/1996 | Takenaka |
| 5,105,550 | A | 4/1992 | Shenoha | 5,505,072 | A | 4/1996 | Oreper |
| 5,109,566 | A | 5/1992 | Kobayashi et al. | 5,507,067 | A | 4/1996 | Hoekstra et al. |
| 5,115,538 | A | 5/1992 | Cochran et al. | 5,510,893 | A | 4/1996 | Suzuki |
| 5,127,128 | A | 7/1992 | Lee | 5,511,147 | A | 4/1996 | Abdel |
| 5,136,675 | A | 8/1992 | Hodson | 5,515,572 | A | 5/1996 | Hoekstra et al. |
| 5,136,750 | A | 8/1992 | Takashima et al. | 5,534,762 | A | 7/1996 | Kim |
| 5,142,985 | A | 9/1992 | Stearns et al. | 5,537,017 | A | 7/1996 | Feiten et al. |
| 5,144,471 | A | 9/1992 | Takanashi et al. | 5,537,711 | A | 7/1996 | Tseng |
| 5,144,714 | A | 9/1992 | Mori et al. | 5,539,953 | A | 7/1996 | Kurz |
| 5,144,715 | A | 9/1992 | Matsuyo et al. | 5,542,146 | A | 8/1996 | Hoekstra et al. |
| 5,152,028 | A | 10/1992 | Hirano | 5,542,148 | A | 8/1996 | Young |
| 5,152,202 | A | 10/1992 | Strauss | 5,546,631 | A | 8/1996 | Chambon |
| 5,155,684 | A | 10/1992 | Burke et al. | 5,548,511 | A | 8/1996 | Bancroft |
| 5,163,202 | A | 11/1992 | Kawakami et al. | 5,551,525 | A | 9/1996 | Pack et al. |
| 5,163,320 | A | 11/1992 | Goshima et al. | 5,553,349 | A | 9/1996 | Kilstrom et al. |
| 5,164,579 | A | 11/1992 | Pryor et al. | 5,555,587 | A | 9/1996 | Guha |
| 5,165,064 | A | 11/1992 | Mattaboni | 5,560,077 | A | 10/1996 | Crotchett |
| 5,170,352 | A | 12/1992 | McTamaney et al. | 5,568,589 | A | 10/1996 | Hwang |
| 5,173,881 | A | 12/1992 | Sindle | D375,592 | S | 11/1996 | Ljunggren |
| 5,182,833 | A | 2/1993 | Yamaguchi et al. | 5,608,306 | A | 3/1997 | Rybeck et al. |
| 5,202,742 | A | 4/1993 | Frank et al. | 5,608,894 | A | 3/1997 | Kawakami et al. |
| 5,204,814 | A | 4/1993 | Noonan et al. | 5,608,944 | A | 3/1997 | Gordon |
| 5,206,500 | A | 4/1993 | Decker et al. | 5,610,488 | A | 3/1997 | Miyazawa |
| 5,208,521 | A | 5/1993 | Aoyama | 5,611,106 | A | 3/1997 | Wulff |
| 5,216,777 | A | 6/1993 | Moro et al. | 5,611,108 | A | 3/1997 | Knowlton et al. |
| 5,227,985 | A | 7/1993 | DeMenthon | 5,613,261 | A | 3/1997 | Kawakami et al. |
| 5,233,682 | A | 8/1993 | Abe et al. | 5,613,269 | A | 3/1997 | Miwa |
| 5,239,720 | A | 8/1993 | Wood et al. | 5,621,291 | A | 4/1997 | Lee |
| 5,251,358 | A | 10/1993 | Moro et al. | 5,622,236 | A | 4/1997 | Azumi et al. |
| 5,261,139 | A | 11/1993 | Lewis | 5,634,237 | A | 6/1997 | Paranjpe |
| 5,276,618 | A | 1/1994 | Everett | 5,634,239 | A | 6/1997 | Tuvin et al. |
| 5,276,939 | A | 1/1994 | Uenishi | 5,636,402 | A | 6/1997 | Kubo et al. |
| 5,277,064 | A | 1/1994 | Knigga et al. | 5,642,299 | A | 6/1997 | Hardin et al. |
| 5,279,672 | A | 1/1994 | Belker, Jr., et al. | 5,646,494 | A | 7/1997 | Han |
| 5,284,452 | A | 2/1994 | Corona | 5,647,554 | A | 7/1997 | Ikegami et al. |
| 5,284,522 | A | 2/1994 | Kobayashi et al. | 5,650,702 | A | 7/1997 | Azumi |
| 5,293,955 | A * | 3/1994 | Lee ............................... 180/169 | 5,652,489 | A | 7/1997 | Kawakami |
| D345,707 | S | 4/1994 | Alister | 5,682,313 | A | 10/1997 | Edlund et al. |
| 5,303,448 | A | 4/1994 | Hennessey et al. | 5,682,839 | A | 11/1997 | Grimsley et al. |
| 5,307,273 | A | 4/1994 | Oh et al. | 5,696,675 | A | 12/1997 | Nakamura et al. |
| 5,309,592 | A | 5/1994 | Hiratsuka | 5,698,861 | A | 12/1997 | Oh |
| 5,310,379 | A | 5/1994 | Hippely et al. | 5,709,007 | A | 1/1998 | Chiang |
| 5,315,227 | A | 5/1994 | Pierson et al. | 5,710,506 | A | 1/1998 | Broell et al. |
| 5,319,827 | A | 6/1994 | Yang | 5,714,119 | A | 2/1998 | Kawagoe et al. |
| 5,319,828 | A | 6/1994 | Waldhauser et al. | 5,717,169 | A | 2/1998 | Liang et al. |
| 5,321,614 | A | 6/1994 | Ashworth | 5,717,484 | A | 2/1998 | Hamaguchi et al. |
| 5,323,483 | A | 6/1994 | Baeg | 5,720,077 | A | 2/1998 | Nakamura et al. |
| 5,324,948 | A | 6/1994 | Dudar et al. | 5,732,401 | A | 3/1998 | Conway |
| 5,341,186 | A | 8/1994 | Kato | 5,735,959 | A | 4/1998 | Kubo et al. |
| 5,341,540 | A | 8/1994 | Soupert et al. | 5,745,235 | A | 4/1998 | Vercammen et al. |
| 5,341,549 | A | 8/1994 | Wirtz et al. | 5,752,871 | A | 5/1998 | Tsuzuki |
| 5,345,649 | A | 9/1994 | Whitlow | 5,756,904 | A | 5/1998 | Oreper et al. |
| 5,353,224 | A | 10/1994 | Lee et al. | 5,761,762 | A | 6/1998 | Kubo et al. |
| 5,363,305 | A | 11/1994 | Cox et al. | 5,764,888 | A | 6/1998 | Bolan et al. |
| 5,363,935 | A | 11/1994 | Schempf et al. | 5,767,437 | A | 6/1998 | Rogers |
| 5,369,347 | A | 11/1994 | Yoo | 5,767,960 | A | 6/1998 | Orman |
| 5,369,838 | A | 12/1994 | Wood et al. | 5,777,596 | A | 7/1998 | Herbert |
| 5,386,862 | A | 2/1995 | Glover et al. | 5,778,486 | A | 7/1998 | Kim |
| 5,399,951 | A | 3/1995 | Lavallee | 5,781,697 | A | 7/1998 | Jeong |
| 5,400,244 | A | 3/1995 | Watanabe et al. | 5,781,960 | A | 7/1998 | Kilstrom et al. |
| 5,404,612 | A | 4/1995 | Ishikawa | 5,786,602 | A | 7/1998 | Pryor et al. |
| 5,410,479 | A | 4/1995 | Coker | 5,787,545 | A | 8/1998 | Colens |
| 5,435,405 | A | 7/1995 | Schempf et al. | 5,793,900 | A | 8/1998 | Nourbakhsh et al. |
| 5,440,216 | A | 8/1995 | Kim | 5,794,297 | A | 8/1998 | Muta |
| 5,442,358 | A | 8/1995 | Keeler et al. | 5,812,267 | A | 9/1998 | Everett, Jr. et al. |
| 5,444,965 | A | 8/1995 | Colens | 5,814,808 | A | 9/1998 | Takada et al. |
| 5,446,356 | A | 8/1995 | Kim | 5,815,880 | A | 10/1998 | Nakanishi |
| 5,446,445 | A | 8/1995 | Bloomfield et al. | 5,815,884 | A | 10/1998 | Imamura et al. |
| 5,451,135 | A | 9/1995 | Schempf et al. | 5,819,008 | A | 10/1998 | Asama et al. |
| 5,454,129 | A | 10/1995 | Kell | 5,819,360 | A | 10/1998 | Fujii |
| 5,455,982 | A | 10/1995 | Armstrong et al. | 5,819,936 | A | 10/1998 | Saveliev et al. |
| 5,465,525 | A | 11/1995 | Mifune et al. | 5,820,821 | A | 10/1998 | Kawagoe et al. |

| | | | | | | |
|---|---|---|---|---|---|---|
| 5,821,730 A | 10/1998 | Drapkin | | 6,108,597 A | 8/2000 | Kirchner et al. |
| 5,825,981 A | 10/1998 | Matsuda | | 6,112,143 A | 8/2000 | Allen et al. |
| 5,828,770 A | 10/1998 | Leis et al. | | 6,112,996 A | 9/2000 | Matsuo |
| 5,831,597 A | 11/1998 | West et al. | | 6,119,057 A | 9/2000 | Kawagoe |
| 5,839,156 A | 11/1998 | Park et al. | | 6,122,798 A | 9/2000 | Kobayashi et al. |
| 5,839,532 A | 11/1998 | Yoshiji et al. | | 6,124,694 A | 9/2000 | Bancroft et al. |
| 5,841,259 A | 11/1998 | Kim et al. | | 6,125,498 A | 10/2000 | Roberts et al. |
| 5,867,800 A | 2/1999 | Leif | | 6,131,237 A | 10/2000 | Kasper et al. |
| 5,869,910 A | 2/1999 | Colens | | 6,138,063 A | 10/2000 | Himeda |
| 5,896,611 A | 4/1999 | Haaga | | 6,142,252 A | 11/2000 | Kinto et al. |
| 5,903,124 A | 5/1999 | Kawakami | | 6,146,278 A | 11/2000 | Kobayashi |
| 5,905,209 A | 5/1999 | Oreper | | 6,154,279 A | 11/2000 | Thayer |
| 5,907,886 A | 6/1999 | Buscher | | 6,154,694 A | 11/2000 | Aoki et al. |
| 5,910,700 A | 6/1999 | Crotzer | | 6,160,479 A | 12/2000 | åhlen et al. |
| 5,911,260 A | 6/1999 | Suzuki | | 6,167,332 A | 12/2000 | Kurtzberg et al. |
| 5,916,008 A | 6/1999 | Wong | | 6,167,587 B1 | 1/2001 | Kasper et al. |
| 5,924,167 A | 7/1999 | Wright et al. | | 6,192,548 B1 | 2/2001 | Huffman |
| 5,926,909 A | 7/1999 | McGee | | 6,216,307 B1 | 4/2001 | Kaleta et al. |
| 5,933,102 A | 8/1999 | Miller et al. | | 6,220,865 B1 | 4/2001 | Macri et al. |
| 5,933,913 A | 8/1999 | Wright et al. | | 6,226,830 B1 | 5/2001 | Hendriks et al. |
| 5,935,179 A | 8/1999 | Kleiner et al. | | 6,230,362 B1 | 5/2001 | Kasper et al. |
| 5,940,346 A | 8/1999 | Sadowsky et al. | | 6,237,741 B1 | 5/2001 | Guidetti |
| 5,940,927 A | 8/1999 | Haegermarck et al. | | 6,240,342 B1 | 5/2001 | Fiegert et al. |
| 5,940,930 A | 8/1999 | Oh et al. | | 6,243,913 B1 | 6/2001 | Frank et al. |
| 5,942,869 A | 8/1999 | Katou et al. | | 6,255,793 B1 | 7/2001 | Peless et al. |
| 5,943,730 A | 8/1999 | Boomgaarden | | 6,259,979 B1 | 7/2001 | Holmquist |
| 5,943,733 A | 8/1999 | Tagliaferri | | 6,261,379 B1 | 7/2001 | Conrad et al. |
| 5,947,225 A | 9/1999 | Kawakami et al. | | 6,263,539 B1 | 7/2001 | Baig |
| 5,950,408 A | 9/1999 | Schaedler | | 6,263,989 B1 | 7/2001 | Won |
| 5,959,423 A | 9/1999 | Nakanishi et al. | | 6,272,936 B1 | 8/2001 | Oreper et al. |
| 5,968,281 A | 10/1999 | Wright et al. | | 6,276,478 B1 | 8/2001 | Hopkins et al. |
| 5,974,348 A | 10/1999 | Rocks | | 6,278,918 B1 | 8/2001 | Dickson et al. |
| 5,974,365 A | 10/1999 | Mitchell | | 6,282,526 B1 | 8/2001 | Ganesh |
| 5,983,448 A | 11/1999 | Wright et al. | | 6,283,034 B1 | 9/2001 | Miles |
| 5,984,880 A | 11/1999 | Lander et al. | | 6,285,778 B1 | 9/2001 | Nakajima et al. |
| 5,987,383 A | 11/1999 | Keller | | 6,285,930 B1 | 9/2001 | Dickson et al. |
| 5,989,700 A | 11/1999 | Krivopal | | 6,300,737 B1 | 10/2001 | Begvall et al. |
| 5,991,951 A | 11/1999 | Kubo et al. | | 6,321,337 B1 | 11/2001 | Reshef et al. |
| 5,995,883 A | 11/1999 | Nishikado | | 6,321,515 B1 | 11/2001 | Colens |
| 5,995,884 A | 11/1999 | Allen | | 6,323,570 B1 | 11/2001 | Nishimura et al. |
| 5,996,167 A | 12/1999 | Close | | 6,324,714 B1 | 12/2001 | Walz et al. |
| 5,998,953 A | 12/1999 | Nakamura et al. | | 6,327,741 B1 | 12/2001 | Reed |
| 5,998,971 A | 12/1999 | Corbridge | | 6,332,400 B1 | 12/2001 | Meyer |
| 6,000,088 A | 12/1999 | Wright et al. | | 6,338,013 B1 | 1/2002 | Ruffner |
| 6,009,358 A | 12/1999 | Angott et al. | | 6,339,735 B1 | 1/2002 | Peless et al. |
| 6,021,545 A | 2/2000 | Delgado et al. | | 6,362,875 B1 | 3/2002 | Burkley |
| 6,023,813 A | 2/2000 | Thatcher et al. | | 6,370,453 B2 | 4/2002 | Sommer |
| 6,023,814 A | 2/2000 | Imamura | | 6,374,155 B1 | 4/2002 | Wallach et al. |
| 6,025,687 A | 2/2000 | Himeda et al. | | 6,374,157 B1 | 4/2002 | Takamura |
| 6,026,539 A | 2/2000 | Mouw et al. | | 6,381,802 B2 | 5/2002 | Park |
| 6,030,464 A | 2/2000 | Azevedo | | 6,385,515 B1 | 5/2002 | Dickson et al. |
| 6,030,465 A | 2/2000 | Marcussen et al. | | 6,389,329 B1 | 5/2002 | Colens |
| 6,032,542 A | 3/2000 | Warnick et al. | | 6,400,048 B1 | 6/2002 | Nishimura et al. |
| 6,036,572 A | 3/2000 | Sze | | 6,401,294 B2 | 6/2002 | Kasper |
| 6,038,501 A * | 3/2000 | Kawakami ............ 701/23 | | 6,408,226 B1 | 6/2002 | Byrne et al. |
| 6,040,669 A | 3/2000 | Hog | | 6,412,141 B2 | 7/2002 | Kasper et al. |
| 6,041,471 A | 3/2000 | Charkey et al. | | 6,415,203 B1 | 7/2002 | Inoue et al. |
| 6,041,472 A | 3/2000 | Kasen et al. | | 6,421,870 B1 | 7/2002 | Basham et al. |
| 6,046,800 A | 4/2000 | Ohtomo et al. | | 6,427,285 B1 | 8/2002 | Legatt et al. |
| 6,049,620 A | 4/2000 | Dickinson et al. | | 6,430,471 B1 | 8/2002 | Kintou et al. |
| 6,052,821 A | 4/2000 | Chouly et al. | | 6,431,296 B1 | 8/2002 | Won |
| 6,055,042 A | 4/2000 | Sarangapani | | 6,437,227 B1 | 8/2002 | Theimer |
| 6,055,702 A | 5/2000 | Imamura et al. | | 6,437,465 B1 | 8/2002 | Nishimura et al. |
| 6,061,868 A | 5/2000 | Moritsch et al. | | 6,438,456 B1 | 8/2002 | Feddema et al. |
| 6,065,182 A | 5/2000 | Wright et al. | | 6,438,793 B1 | 8/2002 | Miner et al. |
| 6,073,432 A | 6/2000 | Schaedler | | 6,442,476 B1 | 8/2002 | Poropat |
| 6,076,025 A * | 6/2000 | Ueno et al. ............ 701/23 | | 6,443,509 B1 | 9/2002 | Levin et al. |
| 6,076,026 A | 6/2000 | Jambhekar et al. | | 6,444,003 B1 | 9/2002 | Sutcliffe |
| 6,076,226 A * | 6/2000 | Reed ................ 15/319 | | 6,446,302 B1 | 9/2002 | Kasper et al. |
| 6,076,227 A | 6/2000 | Schallig et al. | | 6,454,036 B1 | 9/2002 | Airey et al. |
| 6,081,257 A | 6/2000 | Zeller | | D464,091 S | 10/2002 | Christianson |
| 6,088,020 A | 7/2000 | Mor | | 6,457,206 B1 | 10/2002 | Judson |
| 6,094,775 A | 8/2000 | Behmer | | 6,459,955 B1 | 10/2002 | Bartsch |
| 6,099,091 A | 8/2000 | Campbell | | 6,463,368 B1 | 10/2002 | Feiten et al. |
| 6,101,671 A | 8/2000 | Wright et al. | | 6,465,982 B1 | 10/2002 | Bergvall et al. |
| 6,108,031 A | 8/2000 | King et al. | | 6,473,167 B1 | 10/2002 | Odell |
| 6,108,067 A | 8/2000 | Okamoto | | 6,480,762 B1 | 11/2002 | Uchikubo et al. |
| 6,108,076 A | 8/2000 | Hanseder | | 6,481,515 B1 | 11/2002 | Kirkpatrick |
| 6,108,269 A | 8/2000 | Kabel | | 6,490,539 B1 | 12/2002 | Dickson et al. |

| | | |
|---|---|---|
| 6,491,127 B1 | 12/2002 | Holmberg et al. |
| 6,493,612 B1 * | 12/2002 | Bisset et al. ............... 701/23 |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,525,509 B1 | 2/2003 | Petersson et al. |
| D471,243 S | 3/2003 | Cioffi et al. |
| 6,532,404 B2 | 3/2003 | Colens |
| 6,535,793 B2 | 3/2003 | Allard |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Kommer |
| 6,586,908 B2 | 7/2003 | Petersson et al. |
| 6,587,573 B1 | 7/2003 | Stam et al. |
| 6,590,222 B1 * | 7/2003 | Bisset et al. ............ 250/559.29 |
| 6,594,551 B2 | 7/2003 | McKinney et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 * | 8/2003 | Clark et al. ................ 134/6 |
| 6,611,120 B2 | 8/2003 | Song et al. |
| 6,611,734 B2 | 8/2003 | Parker et al. |
| 6,611,738 B2 | 8/2003 | Raffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozik |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,711,280 B2 | 3/2004 | Stafsudd et al. |
| 6,732,826 B2 | 5/2004 | Song et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,101,670 A1 | 8/2005 | Song |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozik |
| 6,941,199 B1 * | 9/2005 | Bottomley et al. ............. 701/23 |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiapetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,324,870 B2 | 1/2008 | Lee |
| 7,328,196 B2 | 2/2008 | Peters |
| 7,332,890 B2 | 2/2008 | Cohen et al. |
| 7,352,153 B2 | 4/2008 | Yan |

| | | |
|---|---|---|
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,617,557 B2 | 11/2009 | Reindle |
| 7,620,476 B2 | 11/2009 | Morse et al. |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,765,635 B2 | 8/2010 | Park |
| 7,801,645 B2 | 9/2010 | Taylor et al. |
| 7,805,220 B2 | 9/2010 | Taylor et al. |
| 7,809,944 B2 | 10/2010 | Kawamoto |
| 7,849,555 B2 | 12/2010 | Hahm et al. |
| 7,853,645 B2 | 12/2010 | Brown et al. |
| 7,920,941 B2 | 4/2011 | Park et al. |
| 7,937,800 B2 | 5/2011 | Yan |
| 7,957,836 B2 | 6/2011 | Myeong et al. |
| 2001/0004719 A1* | 6/2001 | Sommer ................ 701/23 |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De et al. |
| 2002/0011367 A1 | 1/2002 | Kolesnik |
| 2002/0011813 A1 | 1/2002 | Koselka et al. |
| 2002/0016649 A1* | 2/2002 | Jones ................ 700/245 |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0204792 A1 | 10/2004 | Taylor et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0021181 A1 | 1/2005 | Kim et al. |
| 2005/0067994 A1 | 3/2005 | Jones et al. |
| 2005/0085947 A1* | 4/2005 | Aldred et al. ................ 700/253 |
| 2005/0137749 A1 | 6/2005 | Jeon et al. |

| | | |
|---|---|---|
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa et al. |
| 2006/0146776 A1 | 7/2006 | Kim |
| 2006/0190133 A1 | 8/2006 | Konandreas et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0259194 A1 | 11/2006 | Chiu |
| 2006/0259419 A1 | 11/2006 | Monsen et al. |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0114975 A1 | 5/2007 | Cohen et al. |
| 2007/0150096 A1 | 6/2007 | Yeh et al. |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0184518 A1 | 8/2008 | Taylor |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0312429 A1 | 12/2010 | Jones et al. |

FOREIGN PATENT DOCUMENTS

| | | |
|---|---|---|
| DE | 2128842 C3 | 12/1980 |
| DE | 3317376 A1 | 11/1984 |
| DE | 3536907 C2 | 2/1989 |
| DE | 3404202 C2 | 12/1992 |
| DE | 199311014 U1 | 10/1993 |
| DE | 4414683 A1 | 10/1995 |
| DE | 4338841 C2 | 8/1999 |
| DE | 198 49 978 | 2/2001 |
| DE | 19849978 | 2/2001 |
| DE | 19849978 C2 | 2/2001 |
| DE | 10242257 A1 | 4/2003 |
| DE | 10242257 A1 | 4/2003 |
| DE | 102004038074.0 | 6/2005 |
| DE | 10357636 A1 | 7/2005 |
| DE | 10357636 A1 | 7/2005 |
| DE | 102004041021 B3 | 8/2005 |
| DE | 102004041021 B3 | 8/2005 |
| DE | 102005046813 A1 | 4/2007 |
| DE | 102005046913 A1 | 4/2007 |
| DK | 338988 | 12/1988 |
| DK | 198803389 A | 12/1988 |
| EP | 265542 A1 | 5/1988 |
| EP | 281085 A2 | 9/1988 |
| EP | 307381 A3 | 7/1990 |
| EP | 358628 A3 | 5/1991 |
| EP | 437024 A1 | 7/1991 |
| EP | 433697 A3 | 12/1992 |
| EP | 479273 A3 | 5/1993 |
| EP | 294101 B1 | 12/1993 |
| EP | 554978 A3 | 3/1994 |
| EP | 615719 A1 | 9/1994 |
| EP | 0 792 726 A1 | 9/1997 |
| EP | 0 792 726 B1 | 9/1997 |
| EP | 861629 A1 | 9/1998 |
| EP | 930040 A3 | 10/1999 |
| EP | 845237 B1 | 4/2000 |
| EP | 1018315 A1 | 7/2000 |
| EP | 1172719 A1 | 1/2002 |
| EP | 1228734 A3 | 6/2003 |
| EP | 1 331 537 A1 | 7/2003 |
| EP | 1 331 537 B1 | 7/2003 |
| EP | 1 380 245 | 1/2004 |
| EP | 1380245 | 1/2004 |
| EP | 1380245 A1 | 1/2004 |
| EP | 1380246 A2 | 1/2004 |
| EP | 1380246 A3 | 3/2005 |
| EP | 1553472 A1 | 7/2005 |
| EP | 1557730 | 7/2005 |
| EP | 1557730 A1 | 7/2005 |
| EP | 1642522 A2 | 4/2006 |
| EP | 1642522 A3 | 11/2007 |
| ES | 2238196 B1 | 11/2006 |
| FR | 2601443 B1 | 11/1991 |
| FR | 2 828 589 | 8/2001 |
| GB | 702426 A | 1/1954 |
| GB | 2128842 B | 4/1986 |

| | | | | | | |
|---|---|---|---|---|---|---|
| GB | 2213047 A | 8/1989 | | JP | 6137828 A | 5/1994 |
| GB | 2225221 A | 5/1990 | | JP | 6293095 A | 10/1994 |
| GB | 2225221 A | 5/1990 | | JP | 06-327598 | 11/1994 |
| GB | 2 283 838 | 5/1995 | | JP | 6105781 B | 12/1994 |
| GB | 2284957 A | 6/1995 | | JP | 7059702 A2 | 3/1995 |
| GB | 2267360 B | 12/1995 | | JP | 07-129239 | 5/1995 |
| GB | 2300082 B | 9/1999 | | JP | 7059702 B | 6/1995 |
| GB | 2404330 B | 7/2005 | | JP | 07-222705 | 8/1995 |
| GB | 2417354 A | 2/2006 | | JP | 7222705 A | 8/1995 |
| JP | 53021869 U | 2/1978 | | JP | 7222705 A2 | 8/1995 |
| JP | 53110257 A | 9/1978 | | JP | 7270518 A | 10/1995 |
| JP | 53110257 A2 | 9/1978 | | JP | 7281742 A2 | 10/1995 |
| JP | 57014726 A2 | 1/1982 | | JP | 7281752 A | 10/1995 |
| JP | 57064217 A | 4/1982 | | JP | 7-295636 | 11/1995 |
| JP | 59005315 B | 2/1984 | | JP | 7311041 A2 | 11/1995 |
| JP | 59033511 U | 3/1984 | | JP | 7-338573 | 12/1995 |
| JP | 59094005 A | 5/1984 | | JP | 7313417 A | 12/1995 |
| JP | 59099308 U | 7/1984 | | JP | 7313417 A | 12/1995 |
| JP | 59112311 U | 7/1984 | | JP | 7319542 A2 | 12/1995 |
| JP | 59033511 B | 8/1984 | | JP | 8-16776 | 1/1996 |
| JP | 59120124 U | 8/1984 | | JP | 8000393 B2 | 1/1996 |
| JP | 59131668 U | 9/1984 | | JP | 8000393 Y2 | 1/1996 |
| JP | 59164973 A | 9/1984 | | JP | 8016241 A2 | 1/1996 |
| JP | 59184917 A | 10/1984 | | JP | 80000393 Y2 | 1/1996 |
| JP | 2283343 A2 | 11/1984 | | JP | 8016776 B2 | 2/1996 |
| JP | 59212924 A | 12/1984 | | JP | 8063229 A2 | 3/1996 |
| JP | 59226909 A | 12/1984 | | JP | 8083125 A | 3/1996 |
| JP | 60089213 | 5/1985 | | JP | 8083125 A2 | 3/1996 |
| JP | 60089213 U | 6/1985 | | JP | 08-089451 | 4/1996 |
| JP | 60211510 A | 10/1985 | | JP | 8084696 | 4/1996 |
| JP | 60-259895 | 12/1985 | | JP | 8089449 A | 4/1996 |
| JP | 60-293095 | 12/1985 | | JP | 2520732 B2 | 5/1996 |
| JP | 60259895 A | 12/1985 | | JP | 8123548 A | 5/1996 |
| JP | 61023221 A2 | 1/1986 | | JP | 8123548 A | 5/1996 |
| JP | 61097712 A | 5/1986 | | JP | 08-152916 | 6/1996 |
| JP | 61023221 B | 6/1986 | | JP | 8152916 A2 | 6/1996 |
| JP | 62-074018 | 4/1987 | | JP | 08-000393 | 10/1996 |
| JP | 62074018 A | 4/1987 | | JP | 8256960 A2 | 10/1996 |
| JP | 62070709 U | 5/1987 | | JP | 8263137 A | 10/1996 |
| JP | 62-120510 | 6/1987 | | JP | 8263137 A | 10/1996 |
| JP | 62-154008 | 7/1987 | | JP | 8286741 A2 | 11/1996 |
| JP | 62164431 U | 10/1987 | | JP | 8286744 A2 | 11/1996 |
| JP | 62-263508 | 11/1987 | | JP | 8322774 A | 12/1996 |
| JP | 62263507 A | 11/1987 | | JP | 8322774 A2 | 12/1996 |
| JP | 62263508 A | 11/1987 | | JP | 8335112 A | 12/1996 |
| JP | 62189057 U | 12/1987 | | JP | 8335112 A | 12/1996 |
| JP | 63079623 A | 4/1988 | | JP | 9043901 A | 2/1997 |
| JP | 63-183032 | 7/1988 | | JP | 9044240 A | 2/1997 |
| JP | 63158032 A | 7/1988 | | JP | 9047413 A | 2/1997 |
| JP | 63-241610 | 10/1988 | | JP | 09-062354 | 3/1997 |
| JP | 1162454 A | 6/1989 | | JP | 09062354 | 3/1997 |
| JP | 2-6312 | 1/1990 | | JP | 9066855 A | 3/1997 |
| JP | 2006312 U1 | 1/1990 | | JP | 9066855 A | 3/1997 |
| JP | 2026312 B | 6/1990 | | JP | 09-160644 | 6/1997 |
| JP | 2283343 A | 11/1990 | | JP | 9145309 A | 6/1997 |
| JP | 03-051023 | 3/1991 | | JP | 9160644 A | 6/1997 |
| JP | 3051023 A2 | 3/1991 | | JP | 9160644 A2 | 6/1997 |
| JP | 3197758 A | 8/1991 | | JP | 9-179625 | 7/1997 |
| JP | 3201903 A | 9/1991 | | JP | 09-179625 | 7/1997 |
| JP | 4019586 B | 3/1992 | | JP | 9-185410 | 7/1997 |
| JP | 4084921 A | 3/1992 | | JP | 9179625 A2 | 7/1997 |
| JP | 05-046239 | 2/1993 | | JP | 9179685 A2 | 7/1997 |
| JP | 05-046246 | 2/1993 | | JP | 9192069 A2 | 7/1997 |
| JP | 5023269 B | 4/1993 | | JP | 2555263 | 8/1997 |
| JP | 5091604 A2 | 4/1993 | | JP | 9204223 A2 | 8/1997 |
| JP | 5042076 U | 6/1993 | | JP | 9206258 A | 8/1997 |
| JP | 5046246 U | 6/1993 | | JP | 9206258 A2 | 8/1997 |
| JP | 5150827 A | 6/1993 | | JP | 9233712 A | 9/1997 |
| JP | 5150829 A | 6/1993 | | JP | 09251318 | 9/1997 |
| JP | 5046239 B | 7/1993 | | JP | 9251318 A | 9/1997 |
| JP | 5054620 U | 7/1993 | | JP | 9265319 A | 10/1997 |
| JP | 5054620 U | 7/1993 | | JP | 9265319 A | 10/1997 |
| JP | 5040519 Y2 | 10/1993 | | JP | 9269807 A | 10/1997 |
| JP | 5257527 A | 10/1993 | | JP | 9269807 A | 10/1997 |
| JP | 5257533 A | 10/1993 | | JP | 9269810 A | 10/1997 |
| JP | 5285861 A | 11/1993 | | JP | 9269810 A | 10/1997 |
| JP | 06-3251 | 1/1994 | | JP | 02555263 Y2 | 11/1997 |
| JP | 6003251 Y2 | 1/1994 | | JP | 9319431 A | 12/1997 |
| JP | 6026312 U | 4/1994 | | JP | 9319431 A2 | 12/1997 |

| | | | | | | |
|---|---|---|---|---|---|---|
| JP | 9319432 | A | 12/1997 | JP | 2001-275908 | | 10/2001 |
| JP | 9319432 | A | 12/1997 | JP | 2001289939 | A | 10/2001 |
| JP | 9319434 | A | 12/1997 | JP | 2001306170 | A | 11/2001 |
| JP | 9319434 | A | 12/1997 | JP | 2001320781 | A | 11/2001 |
| JP | 9325812 | A | 12/1997 | JP | 2001-525567 | | 12/2001 |
| JP | 9325812 | A | 12/1997 | JP | 2002-78650 | | 3/2002 |
| JP | 10055215 | A | 2/1998 | JP | 2002-204768 | | 7/2002 |
| JP | 10055215 | A | 2/1998 | JP | 2002204769 | A | 7/2002 |
| JP | 10117973 | A | 5/1998 | JP | 2002247510 | A | 8/2002 |
| JP | 10117973 | A | 5/1998 | JP | 2002-532178 | | 10/2002 |
| JP | 10117973 | A2 | 5/1998 | JP | 3356170 | | 10/2002 |
| JP | 10118963 | A | 5/1998 | JP | 2002-323925 | | 11/2002 |
| JP | 10118963 | A | 5/1998 | JP | 3375843 | | 11/2002 |
| JP | 10177414 | A | 6/1998 | JP | 2002333920 | | 11/2002 |
| JP | 10214114 | A | 8/1998 | JP | 2002333920 | A | 11/2002 |
| JP | 10214114 | A2 | 8/1998 | JP | 2002-355206 | | 12/2002 |
| JP | 10228316 | | 8/1998 | JP | 2002-360471 | | 12/2002 |
| JP | 09-043901 | | 9/1998 | JP | 2002-360479 | | 12/2002 |
| JP | 10240342 | A2 | 9/1998 | JP | 2002-360482 | | 12/2002 |
| JP | 10260727 | A2 | 9/1998 | JP | 2002360479 | A | 12/2002 |
| JP | 10-214114 | | 11/1998 | JP | 2002366227 | A | 12/2002 |
| JP | 10295595 | A | 11/1998 | JP | 2002369778 | A | 12/2002 |
| JP | 10295595 | A | 11/1998 | JP | 2002369778 | A2 | 12/2002 |
| JP | 11015941 | A | 1/1999 | JP | 2003-10076 | | 1/2003 |
| JP | 11015941 | A | 1/1999 | JP | 2003010076 | | 1/2003 |
| JP | 11065655 | A2 | 3/1999 | JP | 2003010076 | A | 1/2003 |
| JP | 11085269 | A2 | 3/1999 | JP | 2003010088 | | 1/2003 |
| JP | 11102219 | A2 | 4/1999 | JP | 2003010088 | A | 1/2003 |
| JP | 11102220 | A | 4/1999 | JP | 2003015740 | | 1/2003 |
| JP | 11102220 | A | 4/1999 | JP | 2003015740 | A | 1/2003 |
| JP | 11162454 | A | 6/1999 | JP | 2003028528 | A | 1/2003 |
| JP | 11-178764 | | 7/1999 | JP | 2003-5296 | | 2/2003 |
| JP | 11-178765 | | 7/1999 | JP | 2003-036116 | | 2/2003 |
| JP | 11174145 | A | 7/1999 | JP | 2003-38401 | | 2/2003 |
| JP | 11174145 | A | 7/1999 | JP | 2003-38402 | | 2/2003 |
| JP | 11175149 | A | 7/1999 | JP | 2003-505127 | | 2/2003 |
| JP | 11175149 | A | 7/1999 | JP | 2003047579 | A | 2/2003 |
| JP | 11178764 | A | 7/1999 | JP | 2003052596 | A | 2/2003 |
| JP | 11178765 | A | 7/1999 | JP | 2003-061882 | | 3/2003 |
| JP | 11-212642 | | 8/1999 | JP | 2003061882 | | 3/2003 |
| JP | 11-508810 | | 8/1999 | JP | 2003084994 | A | 3/2003 |
| JP | 11212642 | A | 8/1999 | JP | 2003167628 | | 6/2003 |
| JP | 11212642 | A2 | 8/1999 | JP | 2003167628 | A | 6/2003 |
| JP | 11213157 | A | 8/1999 | JP | 2003180586 | | 7/2003 |
| JP | 11213157 | A | 8/1999 | JP | 2003180586 | A | 7/2003 |
| JP | 11-510935 | | 9/1999 | JP | 2003180587 | A | 7/2003 |
| JP | 11248806 | A | 9/1999 | JP | 2003186539 | A | 7/2003 |
| JP | 11-282532 | | 10/1999 | JP | 2003190064 | A | 7/2003 |
| JP | 11282532 | A | 10/1999 | JP | 2003190064 | A2 | 7/2003 |
| JP | 11282533 | A | 10/1999 | JP | 2003241836 | A | 8/2003 |
| JP | 11295412 | A | 10/1999 | JP | 2003262520 | | 9/2003 |
| JP | 11295412 | A | 10/1999 | JP | 2003262520 | A | 9/2003 |
| JP | 11346964 | A2 | 12/1999 | JP | 2003285288 | A | 10/2003 |
| JP | 2000047728 | A | 2/2000 | JP | 2003304992 | | 10/2003 |
| JP | 2000056006 | | 2/2000 | JP | 2003304992 | A | 10/2003 |
| JP | 2000056006 | A | 2/2000 | JP | 2003-310489 | | 11/2003 |
| JP | 2000056831 | | 2/2000 | JP | 2003310509 | | 11/2003 |
| JP | 2000056831 | A | 2/2000 | JP | 2003310509 | A | 11/2003 |
| JP | 2000066722 | | 3/2000 | JP | 2003330543 | A | 11/2003 |
| JP | 2000066722 | A | 3/2000 | JP | 1004123040 | A | 4/2004 |
| JP | 2000075925 | | 3/2000 | JP | 2004123040 | | 4/2004 |
| JP | 2000075925 | A | 3/2000 | JP | 2004-219185 | | 5/2004 |
| JP | 10240343 | A2 | 5/2000 | JP | 2004148021 | | 5/2004 |
| JP | 20000275321 | A | 10/2000 | JP | 2004148021 | A | 5/2004 |
| JP | 11-162454 | | 12/2000 | JP | 2004160102 | | 6/2004 |
| JP | 2000-353014 | | 12/2000 | JP | 2004160102 | A | 6/2004 |
| JP | 2000353014 | A2 | 12/2000 | JP | 2004160102A | | 6/2004 |
| JP | 20000353014 | A | 12/2000 | JP | 2004166968 | A | 6/2004 |
| JP | 200122443 | | 1/2001 | JP | 2004174228 | | 6/2004 |
| JP | 2001022443 | A | 1/2001 | JP | 2004198330 | A | 7/2004 |
| JP | 2001067588 | A | 3/2001 | JP | 2004219185 | A | 8/2004 |
| JP | 2001087182 | | 4/2001 | JP | 2005352707 | | 2/2005 |
| JP | 2001087182 | A | 4/2001 | JP | 2005118354 | | 5/2005 |
| JP | 2001121455 | A | 5/2001 | JP | 2005135400 | | 5/2005 |
| JP | 2001125641 | A | 5/2001 | JP | 2005135400 | A | 5/2005 |
| JP | 2001216482 | A | 8/2001 | JP | 2005211360 | A | 8/2005 |
| JP | 2001-258807 | | 9/2001 | JP | 2005224265 | A | 8/2005 |
| JP | 2001265437 | | 9/2001 | JP | 200545916 | A | 9/2005 |
| JP | 2001265437 | A | 9/2001 | JP | 2005230032 | A | 9/2005 |

| | | |
|---|---|---|
| JP | 2005245916 | 9/2005 |
| JP | 2005296511 A | 10/2005 |
| JP | 2005346700 A2 | 12/2005 |
| JP | 2005352707 A | 12/2005 |
| JP | 2006043071 | 2/2006 |
| JP | 2006043071 A | 2/2006 |
| JP | 2006155274 | 6/2006 |
| JP | 2006155274 A | 6/2006 |
| JP | 2006164223 A | 6/2006 |
| JP | 2006227673 A | 8/2006 |
| JP | 2006247467 | 9/2006 |
| JP | 2006247467 A | 9/2006 |
| JP | 2006260161 | 9/2006 |
| JP | 2006260161 A | 9/2006 |
| JP | 2006293662 | 10/2006 |
| JP | 2006293662 A | 10/2006 |
| JP | 2006296697 | 11/2006 |
| JP | 2006296697 A | 11/2006 |
| JP | 2007034866 | 2/2007 |
| JP | 2007034866 A | 2/2007 |
| JP | 2007213180 | 8/2007 |
| JP | 2007213180 A | 8/2007 |
| JP | 04074285 B2 | 4/2008 |
| JP | 2009015611 | 1/2009 |
| JP | 2009015611 A | 1/2009 |
| JP | 2010198552 | 9/2010 |
| JP | 2010198552 A | 9/2010 |
| WO | WO95/26512 | 10/1995 |
| WO | WO9530887 A1 | 11/1995 |
| WO | 943901 C | 2/1997 |
| WO | WO9617258 A3 | 2/1997 |
| WO | WO97/15224 | 5/1997 |
| WO | WO97/40734 | 11/1997 |
| WO | WO97/41451 | 11/1997 |
| WO | WO98/53456 | 11/1998 |
| WO | WO9905580 A2 | 2/1999 |
| WO | WO99/16078 | 4/1999 |
| WO | WO99/28800 | 6/1999 |
| WO | WO99/38056 | 7/1999 |
| WO | WO99/38237 | 7/1999 |
| WO | WO99/43250 | 9/1999 |
| WO | WO99/59042 | 11/1999 |
| WO | WO00/04430 | 1/2000 |
| WO | WO00/36962 | 6/2000 |
| WO | WO00/38026 | 6/2000 |
| WO | WO00/38029 | 6/2000 |
| WO | WO0038028 A1 | 6/2000 |
| WO | WO0038028 A1 | 6/2000 |
| WO | WO00/78410 | 12/2000 |
| WO | WO01/06904 | 2/2001 |
| WO | WO01/06905 | 2/2001 |
| WO | WO0180703 A1 | 11/2001 |
| WO | WO0191623 A2 | 12/2001 |
| WO | WO02/39864 | 5/2002 |
| WO | WO02/39868 | 5/2002 |
| WO | WO02/058527 | 8/2002 |
| WO | WO02/062194 | 8/2002 |
| WO | WO02/067744 | 9/2002 |
| WO | WO02/067745 | 9/2002 |
| WO | WO 02/071175 | 9/2002 |
| WO | WO02/074150 | 9/2002 |
| WO | WO02/075356 | 9/2002 |
| WO | WO02/075469 | 9/2002 |
| WO | WO02/075470 | 9/2002 |
| WO | WO0267752 A1 | 9/2002 |
| WO | WO0269775 A2 | 9/2002 |
| WO | WO02067752 A1 | 9/2002 |
| WO | WO02069774 A1 | 9/2002 |
| WO | WO02069775 A2 | 9/2002 |
| WO | WO02071175 | 9/2002 |
| WO | WO02075350 A1 | 9/2002 |
| WO | WO02081074 A1 | 10/2002 |
| WO | WO02/101477 | 12/2002 |
| WO | WO03015220 A1 | 2/2003 |
| WO | WO03024292 A2 | 3/2003 |
| WO | WO03/026474 | 4/2003 |
| WO | WO03/040845 | 5/2003 |
| WO | WO03/040846 | 5/2003 |
| WO | WO0269775 A3 | 5/2003 |
| WO | WO02069775 A3 | 5/2003 |
| WO | WO03040546 A1 | 5/2003 |
| WO | WO03062850 A2 | 7/2003 |
| WO | WO03062852 A1 | 7/2003 |
| WO | WO2004/004533 | 1/2004 |
| WO | WO2004/006034 | 1/2004 |
| WO | WO2005/077244 | 1/2004 |
| WO | WO2006/068403 | 1/2004 |
| WO | WO2004004534 A1 | 1/2004 |
| WO | WO2004005956 A1 | 1/2004 |
| WO | W02004025947 A3 | 5/2004 |
| WO | WO2004043215 A1 | 5/2004 |
| WO | WO2004043215 A1 | 5/2004 |
| WO | WO 2004/058028 | 7/2004 |
| WO | WO 2004/059409 | 7/2004 |
| WO | WO2004058028 | 7/2004 |
| WO | WO2004059409 A1 | 7/2004 |
| WO | WO2005006935 A1 | 1/2005 |
| WO | WO2005006935 A1 | 1/2005 |
| WO | WO2005036292 A1 | 4/2005 |
| WO | WO2005036292 A1 | 4/2005 |
| WO | WO2005/055795 | 6/2005 |
| WO | WO2005055795 A1 | 6/2005 |
| WO | WO2005055796 | 6/2005 |
| WO | WO2005055796 A2 | 6/2005 |
| WO | WO2005076545 A1 | 8/2005 |
| WO | WO2005077243 A1 | 8/2005 |
| WO | W02005083541 A1 | 9/2005 |
| WO | WO2005081074 A1 | 9/2005 |
| WO | WO2005082223 A1 | 9/2005 |
| WO | WO2005082223 A1 | 9/2005 |
| WO | WO2005098475 A1 | 10/2005 |
| WO | WO2005098476 A1 | 10/2005 |
| WO | WO2006046400 A1 | 5/2006 |
| WO | WO 2006/061133 | 6/2006 |
| WO | WO2006061133 A1 | 6/2006 |
| WO | WO2006068403 A1 | 6/2006 |
| WO | WO2006007328 A1 | 7/2006 |
| WO | WO2006073248 A1 | 7/2006 |
| WO | WO2006073248 A1 | 7/2006 |
| WO | WO2007036490 A2 | 4/2007 |
| WO | WO2007036490 A3 | 5/2007 |
| WO | WO2007065033 A2 | 6/2007 |
| WO | WO2007137234 A2 | 11/2007 |

OTHER PUBLICATIONS

Cameron Morland, Autonomous Lawn Mower Control, Jul. 24, 2002.
Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993.
Electrolux designed for the well-lived home, website: http://www.electroluxusa.com/node57.as[?currentURL=node142.asp%3F, acessed Mar. 18, 2005.
eVac Robotic Vacuum S1727 Instruction Manual, Sharper Image Corp, Copyright 2004.
Everyday Robots, website: http://www.everydayrobots.com/index.php?option=content&task=view&id=9, accessed Apr. 20, 2005.
Examination report dated Mar. 14, 2008 for U.S. Appl. No. 11/771,356.
Examination report dated Mar. 27, 2006 for U.S. Appl. No. 10/839,374.
Examination report dated Apr. 11, 2004 for corresponding EP application No. 02734767.3.
Examination report dated Apr. 29, 2005 for corresponding EP application No. 02734767.3.
Examination report dated May 4, 2005 for U.S. Appl. No. 10/839,374.
Examination report dated May 14, 2009 for U.S. Appl. No. 11/771,433.
Examination report dated Jul. 24, 2009 for U.S. Appl. No. 11/771,433.
Examination report dated Aug. 9, 2004 for U.S. Appl. No. 10/839,374.

Examination report dated Sep. 3, 2003 for U.S. Appl. No. 10/167,851.
Examination report dated Oct. 1, 2010 for U.S. Appl. No. 12/609,124.
Examination report dated Nov. 8, 2005 for corresponding EP application No. 02734767.3.
Examination report dated Nov. 30, 2010 for U.S. Appl. No. 12/826,909.
Examination report dated Dec. 29, 2003 for U.S. Appl. No. 10/167,851.
Examination report dated Jun. 14, 2011 for corresponding application JP 2008-246310.
Facts on the Trilobite webpage: "http://trilobiteelectroluxse/presskit_en/node11335asp?print=yes&pressID=" accessed Dec. 12, 2003.
Friendly Robotics Robotic Vacuum RV400—The Robot Store website: http://www.therobotstore.com/s.nl/sc.9/category,-109/it.A/id.43/.f, accessed Apr. 20, 2005.
Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.
koolvac Robotic Vacuum Cleaner Owner's Manual, Koolatron, Undated.
NorthStar Low-Cost, Indoor Localization, Evolution robotics, Powering Intelligent Products.
Robot Review Samsung Robot Vacuum (VC-RP30W), website: http://www.onrobo.com/reviews/At_Home/Vacuun_Cleaners/on00vcrp30rosam/index.htm, accessed Mar. 18, 2005.
Yata et al "Wall Following Using Angle Information Measured by a Single Ultrasonic Transducer" IEEE, May 1998.
Zoombot Remote Controlled Vaccum-RV-500 New Roomba 2, website: http://cgi.ebay.com/ws/eBayISAPI.dll?ViewItem&category=43526&item=4373497618&rd=1, accessed Apr. 20, 2005.
U.S. Appl. No. 60/605,066, filed Aug. 27, 2004, Taylor.
U.S. Appl. No. 60/605,181, filed Aug. 27, 2004, Taylor.
Euroflex Intelligente Monstre Mauele (English only except).
Roboking—not just a vacuum cleaner, a robot!
SVET Computers—New Technologies—Robot vacuum claeaner.
http://www.gizmag.com/go/1282/.
http://www.electrolux-ui.com:8080/2002%5C822%5C833102EN.pdf.
http//www.robotsandrelax.com/PDFs/RV400Manual.pdf.
http//www.hitachi.co.jp/New/cnews/hl_030529_hl_030529.pdf.
http://robotbg.com/news/2003/04/22/lg_announces_the_first_robotic_vacuum_cleaner_of_korea.
www.metapo.com/support/user_manual.pdf.
http://us.aving.net/news/view.php?articleId=23031.
http://www.taipeitimes.com/News/worldbiz/archives/2002/03/26/000129338.
http://ascii.jp/elem/000/000/330/330024/.
http://us.aving.net/news/view.php?articleId=7257.
Examination report dated Oct. 18, 2011 for corresponding application No. 101.83338.2.
Examination report dated Oct. 18, 2011. For corresponding application No. 10183321.8.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May, 2002.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", ED Online ID# 13114, 17 pages, Jul. 2006.
Yun, et al. "Robust Positioning a Mobile Robot with Active Beacon Sensors", Lecture Notes in Computer Science, 2006, vol. 4251, pp. 890-897, 2006.
Yuta, et al. "Implementation of an Active Optical Range sensor Using Laser Slit for In-Door Intelligent Mobite Robot", IEE/RSJ International workshop on Intelligent Robots and systems (IROS 91) vol. 1, Osaka, Japan, pp. 415-420. Nov. 3-5, 1991.
Zha et al. "Mobile Robot Localization Using Incomplete Maps for Change Detection in a Dynamic Environment", Advanced Intelligent Mechatronics '97. Final Program and Abstacts., IEEE/ASME International Conference, pp. 11, Jun. 16-20, 1997.
Zhang, et al. "A Novel Mobile Robot Localization Based on Vision", SPIE vol. 6279, 6 pages, Jan. 29, 2007.
SVET Computers—New Technologies—Robot vacuum cleaner, 1 page, Oct. 1999.
Electrolux Trilobite, http://www.electrolux-ui.com:8080/2002%5C822%5C833102EN.pdf 10 pages, Jan. 12, 2001.
Electrolux Trilobite, Time to enjoy life, 38 pages http://www.robocon.co.kr/trilobite/Presentation_Trilobite_Kor_030104. ppt accessed Dec. 22, 2011.
FloorBotics, VR-8 Floor Cleaning Robot, Product Description for Manuafacturers, http://www.consensus.com.au/SoftwareAwards/CSAarchive/CSA2004/CSAart04/FloorBot/F, 2004.
Robot Buying Guide, LG announces the first robotic vacuum cleaner for Korea, Apr. 21, 2003 http://robotbg.com/news/2003/04/22/lg_announces_the_first_robotics_vacu.
CleanMate 365, Intelligent Automatic Vacuum Cleaner, Model No. QQ-1, User Manual www.metapo.com/support/user_manual.pdf 11 pages.
http://ascii.jp/elem/000/000/330/330024/, 11/1/20111.
Special Reports, Vacuum Cleaner Robot Operated in Conjunction with 3G Celluar Phone vol. 59, No. 9 (2004) 3 pages http://www.toshiba.co.jp/tech/review/2004/09/59_0.
McLurkin "The Ants: A community of Microrobots", Paper submitted for requirements of BSEE at MIT, May 12, 1995.
Hitachi "Feature", http://kadenfan.hitachi.co.jp/robot/feature.html, 1 page Nov. 19, 2008.
Home Robot—UBOT; Microbotusa.com, retrieved from the WWW at www.microrobotusa.com, accedded Dec. 2, 2008.
Jarosiewicz et al. "Final Report—Lucid", University of Florida, Departmetn of Electrical and Computer Engineering, EEL 5666—Intelligent Machines Design Laboratory, 50 pages, Aug. 4, 1999.
Jensfelt, et al. "Active Global Localization for a mobile robot using multiple hypothesis tracking", IEEE Transactions on Robots and Automation vol. 17, No. 5, pp. 748-760, Oct. 2001.
Karlsson, et al Core Technologies for service Robotics, IEEE/RSJ International Conference on intelligent Robots and Systems (IROS 2004), vol. 3, pp. 2979-2984, Sep. 28-Oct. 2. 2004.
Knight, et al., "Lovalization and Identification of Visual Landmarks", Journal of Computing Sciences in Colleges, vol. 16, Issue 4, 2001 pp. 312-313, May 2001.
Kolodko et al. "Experimental System for Real-Time Motion Estimation", Proceedings of the 2003 IEEE/ASME International Conference on Advanced Intelligent Mechatronics (AIM 2003), pp. 981-986, 2003.
Koolatron "KOOLVAC—Owner's Manual", 13 pages.
Krotov, et al. "Digital Sextant", Downloaded from the internet at: http://www.cs.cmu.edu/~epl/, 1 page, 1995.
Kurth, "Range-Only Robot Localization and SLAM with Radio", http://www.ri.cmu.edu/pub_files/pub4/kurth_derek_2004_1/kurth_derek_2004_1.pdf. 60 pages, May, 2004.
Lambrinos, et al. "A mobile robot employing insect strategies for navigation", http://www8.cs.umu.se/kurser/TDBD17/VT04/dl/Assignment%20Papers/lambrinos-RAS-2000.pdf. 38 pages, Feb. 19, 1999.
LaValle et al. "Robot Motion Planning in a Changing, Partially Predictable Environment", 1994 IEEE International Symposium on Intelligent Control, Columbus, OH, pp. 261-266, Aug. 16-18, 1994.
Lee, et al. "Development of Indoor Navigation system for Humanoid Robot Using Multi-sensors Integration", ION NTM, San Diego, CA pp. 798-805, Jan. 22-24, 2007.
Leonard, et al. "Mobile Robot Localization by tracking Geometric Beacons", IEEE Transaction on Robotics and Automation, vol. 7, No. 3 pp. 376-382, Jun. 1991.
Li et al. "Robust Statistical Methods for Securing Wireless Localization in Sensor Networks", Wireless Information Network Laboratory, Rutgers University, 20051.
Li et al. "Making a Local Map of Indoor Environments by Swiveling a Camera and a Sonar", Proceedings of the 1999 IEEE/RSJ International Conference on Intelligent Robots and Systems, pp. 954-959, 1999.

Lin, et al., "Mobile Robot Navigation Using Artificial Landmarks", Journal of robotics System 14(2). pp. 93-106, 1997.

Linde "Dissertation, "On Aspects of Indoor Localization"" https://eldorado.tu-dortmund.de/handle/2003/22854, University of Dortmund, 138 pages, Aug. 28, 2006.

Luo et al., "Real-time Area-Covering Operations with Obstacle Avoidance for Cleaning Robots," 2002, IEeE, pp. 2359-2364.

Madsen, et al. "Optimal landmark selection for triangulation of robot position", Journal of Robotics and Autonomous Systems vol. 13 pp. 277-292, 1998.

Martishevcky, "The Accuracy of point light target coordinate determination by dissectoral tracking system", SPIE vol. 2591 pp. 25-30.

Matsutek Enterprises Co. Ltd "Automatic Rechargeable Vacuum Cleaner", http://matsutek.manufacturer.globalsources.com/si/6008801427181/pdtl/Home-Vacuum/10 . . . , Apr. 23, 2007.

McGillem, et al. "Infra-red Lacation System for Navigation and Autonomous Vehicles", 1988 IEEE International Conference on Robotics and Automation, vol. 2, pp. 1236-1238, Apr. 24-29, 1988.

McGillem, et al. "A Beacon Navigation Method for Autonomous Vehicles", IEEE Transactions on Vehicular Technology, vol. 38, No. 3, pp. 132-139, Aug. 1989.

Michelson "Autonomous Navigation", 2000 Yearbook of Science & Technology, McGraw-Hill, New York. ISBN 0-07-052771-7, pp. 28-30, 1999.

On Robo "Robot Reviews Samsung Robot Vacuum (VC-RP30W)", www.onrobo.com/reviews/AT_Home/vacuum_cleaners/on00vcrb30rosam/index.htm. 2 pages, 2005.

InMach "Intelligent Machines", www.inmach.de/inside.html, 1 page, Nov. 19, 2008.

Borges et al. "Optimal Mobile Robot Pose Estimation Using Geometrical Maps", IEEE Transactions on Robotics and Automation, vol. 18, No. 1, pp. 87-94, Feb. 2002.

Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.

Bulusu, et al. "Self Configuring Localization systems: Design and Experimental Evaluation", ACM Transactions on Embedded Computing Systems vol. 3 No. 1 pp. 24-60, 2003.

Caccia, et al. "Bottom-Following for Remotely Operated Vehicles", 5th IFAC conference, Alaborg, Denmark, pp. 245-250 Aug. 1, 2000.

Chae, et al. "StarLITE: A new artificial landmark for the navigation of mobile robots", http://www.irc.atr.jp/jk-nrs2005/pdf/Starlite.pdf, 4 pages, 2005.

Chamberlin et al. "Team 1: Robot Locator Beacon System" NASA Goddard SFC, Design Proposal, 15 pages, Feb. 17, 2006.

Champy "Physical management of IT assets in Data Centers using RFID technologies", RFID 2005 University, Oct. 12-14, 2005.

Chiri "Joystick Control for Tiny OS Robot", http://www.eecs.berkeley.edu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Andersen et al., "Landmark based navigation strategies", SPIE Conference on Mobile Robots XIII, SPIE vol. 3525, pp.

Clerentin, et al. "A localization method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. Of SPIE vol. 3965. pp. 1-12, May 15, 2000.

Desaulniers, et al. "An Efficient Algorithm to find a shortest path for a car-like Robot", IEEE Transactions on robotics and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorfrnueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Dudek, et al. "Localizing A Robot with Minimum Travel"Proceedings of the sixth annual ACM-SIAM symposium on Discrete algorithms, vol. 27 No. 2 pp. 583-604, Apr. 1998.

Dulimarta, et al. "Mobile Robot Localization in Indoor Environment", Pattern Recognition, vol. 30, No. 1, pp. 99-111, 1997.

EBay "Roomba Timer -> Timed Cleaning—Floorvac Robotic Vacuum", Cgi.ebay.com/ws/eBayISAPI.dll?viewitem&category=43526&item=4375198387&rd=1, 5 pages, Apr. 20, 2005.

Electrolux "Welcome to the Electrolux trilobite" www.electroluxusa.com/node57.asp?currentURL=node142.asp%3F, 2 pages, Mar. 18, 2005.

Barker, "Navigation by the Stars—Ben Barker 4th Year Project" Power point pp. 1-20.

Facchinetti, Claudio et al. "Using and Learning Vision-Based Self-Positioning for Autonomous Robot Navigation" ICARCV '94, vol. 3 pp. 1694-1698, 1994.

Fayman "Exploiting Process Integration and Composition in the contexl of Active Vision", IEEE Transactions on Systems, Man, and Cybernetics—Part C: Application and reviews, vol. 29 No. 1, pp. 73-86, Feb. 1999.

Florbot GE Plastics Image (1989-1990).

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages Apr. 20, 2005.

Fuentes, et al. "Mobile Robotics 1994", University of Rochester. Computer Science Department, TR 588, 44 pages, Dec. 7, 1994.

Bison, P et al., "Using a structured beacon for cooperative position estimation" Robotics ad Autonomous Systems vol. 29, No. 1, pp. 33-40, Oct. 1999.

Fukuda, et al. "Navigation System based on Ceiling Landmark Recognition for Autonomous mobile robot", 1995 IEEE/RSJ Internationai Conference on Intelligent Robots and Systems 95. 'Human Robot Interaction and Cooperative Robots', Pittsburgh, PA, pp. 1466/1471, Aug. 5-9, 1995.

Gionis "A hand-held optical surface scanner for environmental Modeling and Virtual Reality", Virtual Reality World, 16 pages 1996.

Goncalves et al "A Visual Front-End for Simultaneous Localization and Mapping", Proceedings of the 2005 IEEE International Conference on Robotics and Automation, Barcelona, Spain, pp. 44-49, Apr. 2005.

Gregg et al. "Autonomous Lawn Care Applications", 2006 Florida Conference on Recent Advances in Robotics, FCRAR 2006, pp. 1-5, May 25-26, 2006.

Hamamatsu "SI PIN Diode S5980, S5981 S5870—Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp?promo=xsells, 3 pages, Mar. 18, 2005.

Haralick et al. "Pose Estimation from Corresponding Point Data", IEEE Transactions on systems, Man, and Cybernetics, vol. 19, No. 6, pp. 1426-1446, Nov. 1989.

Hauser "About the Scaling Behaviour of Optical Range Sensors" Fringe '97 Proceedings of the 3rd International Workshop on Automatic Processing of Fringe Patterns, Bremen, Germany, pp. 147-155, Sep. 15-17, 1997.

Blaasvaer, et al. "AMOR—An Autonomous Mobile Robot Navigation System", Proceedings of the IEEE International Conference on Systems, and Cybernetics, pp. 2266-2271, 1994.

Hoag, et al. "Navigation and Guidance in interstellar space", ACTA Astronautica vol. 2, pp. 513-533, Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php?ubre=111, 3 pages, Mar. 18, 2005.

Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.

Pages, et al. "Robust decoupled visual servoing based on stuctured light", 2005 IEEE/RSJ Int. Conf. on Intelligent Robots and Systems, pp. 2676-2681, 2005.

Paromtchik "Toward Optical Guidance of Mobile Robots".

Pirjanian "Reliable Reaction", Proceedings of the 1996 IEEE/SICE/RSJ International Conference on Multisensor Fusion and Integration for Intelligent Systems, pp. 158-165, 1996.

Piranian "Challenges for Standards for consumer Robotics", IEEE Workshop on Advanced Robotics and its Social impacts, pp. 260-264, Jun. 12-15, 2005.

Pirjanian et al. "Distributed Control for a Modular, Reconfigurable Cliff Robot", Proceedings of the 2002 IEEE International Conference on Robotics & Automation. Washington, D.C. pp. 4083-4088, May, 2002.

Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.

Radio Frequency Identification: Tracking ISS Consumables, Author Unknown, 41 pages (NPL0127).

Ronnback "On Methods for Assistive Mobile Robots", http://www.openthesis.org/documents/methods-assistive-mobile-robots-595019.html, 218 pages. Jan. 1, 2006.

Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.

Sebastian Thrun, Learning Occupancy Grid Maps With Forward Sensor Models, School of Computer Science, Carnegie Mellon University, pp. 1-28.

Shimoga et al, "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.

The Sharper Image "e-Vac Robotic Vacuum, S1727 Instructions" www.sharperimage.com, 18 pages.

The Sharper Image "Robotic Vacuum Cleaner —Blue" www.Sharperimage.com, 2 pages, Mar. 18, 2005.

The Sharper Image "E Vac Robotic Vacuum" www.sharperiamge.com/us/en/templates/products/pipmorework1printable.jhtml, 2 pages, Mar. 18, 2005.

TheRobotStore.com "Friendly Robotics Robotic Vacuum RV400—The Robot Store", www.therobotstore.com/s.nl/sc.9/category.-109/it.A/id.43/.f, 1 page, Apr. 20, 2005.

TotaiVac.com RC3000 RoboCleaner website Mar. 18, 2005.

Tribelhorn et al., "Evaluating the Roomba: A low-cost, ubiquitous platform for robotics research and education," 2007, IEEE, p. 1393-1399.

Andersen et al., "Landmark based navigation strategies", SPIE Conference on Mobile Robots XIII, SPIE vol. 3525, pp. 170-181, Jan. 8, 1999.

Ascii, Mar. 25, 2002, http://ascii.jp/elem/000/000/330/330024/ accessed Nov. 1, 2011.

Li et al. "Robust Statistical Methods for Securing Wireless Localization in Sensor Networks," Information Procesing in Sensor Networks, 2005, Fourth International Symposium on, pp. 91-98, Apr. 2005.

Martishevcky, "The Accuracy of point light target coordinate determination by dissectoral tracking system", SPIE vol. 2591, pp. 25-30, Oct. 23, 2005.

Maschinemarkt Würzburg 105, Nr. 27, pp. 3, Jul. 5, 1999.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

SVET Computers—New Technologies—Robot Vacuum Cleaner, Oct. 1999, available at http://www.sk.rs/1999/10/sknt01.html, accessed Nov. 1, 2011.

Hitachi, http://www.hitachi.co.jp/New/cnews/hi_030529_hi 030529.pdf, 8 pages, May 29, 2003.

Hitachi 'Feature', http://kadenfan.hitachi.co.jp/robot/feature/feature.html, 1 page, Nov. 19, 2008.

Jarosiewicz et al. "Final Report—Lucid", University of Florida, Departmetn of Electrical and Computer Engineering, EEL 5666—Intelligent Machine Design Laboratory, 50 pages, Aug. 4, 1999.

Jensfelt, et al. "Active Global Localization for a mobile robot using multiple hypothesis tracking", IEEE Transactions on Robots and Automation vol. 17. No. 5, pp. 748-760, Oct. 2001.

Jeong, et al. "An intelligent map-building system for indoor mobile robot using low cost photo sensors", SPIE vol. 6042 6 pages, 2005.

Kahney, "Robot Vacs are in the House," www.wired.com/news/technology/o,1282,59237,00.html, 6 pages, Jun. 18, 2003.

Karcher "Product Manual Download Karch", www.karcher.com, 17 pages, 2004.

Karcher "Karcher RoboCleaner RC 3000", www.robocleaner.de/english/screen3.html, 4 pages, Dec. 12, 2003.

Karcher USA "RC 3000 Robotics cleaner", www.karcher-usa.com, 3 pages, Mar. 18, 2005.

Karlsson et al., The vSLAM Algorithm for Robust Localization and Mapping, Proceedings of the 2005 IEEE International Conference on Robotics and Automation, Barcelona, Spain, pp. 24-29, Apr. 2005.

Karlsson, et al Core Technologies for service Robotics, IEEE/RSJ International Conference on Intelligent Robots and Systems (IROS 2004), vol. 3, pp. 2979-2984, Sep. 28-Oct. 2, 2004.

King "Heplmate-TM-Autonomous mobile Robots Navigation Systems", SPIE vol. 1388 Mobile Robots pp. 190-198, 1990.

Kleinberg, The Localization Problem for Mobile Robots, Laboratory for Computer Science, Massachusetts Institute of Technology, 1994 IEEE, pp. 521-531, 1994.

Knight et al., "Localization and Identification of Visual Landmarks", Journal of Computing Sciences in Colleges, vol. 16 Issue 4, 2001 pp. 312-313, May 2001.

Kolodko et al. "Experimental System for Real-Time Estimation", Proceedings of the 2003 IEEE/ASME International Conference on Advanced Intelligent Mechatronics (AIM 2003), pp. 981-986, 2003.

Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.

Krotov, et al. "Digital Sextant", Downloaded from the internet at: http://www.cs.cmu.edu/~epk/, 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004.

Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.

Lang et al. "Visual Measurement of Orientation Using Ceiling Features", 1994 IEEE, pp. 552-555, 1994.

Lapin, "Adaptive position estimation for an automated guided vehicle", SPIE vol. 1831 Mobile Robots VII, pp. 82-94, 1992.
LaValle et al. "Robot Motion Planning in a Changing, Padially Predictable Environment", 1994 IEEE International Symposium on Intelligent Control, Columbus, OH, pp. 261-266, Aug. 16-18, 1994.
Lee, et al. "Localization of a Mobile Robot Using the Image of a Moving Object", IEEE Transaction on Industrial Electronics, vol. 50, No. 3 pp. 612-619, Jun. 2003.
Lee, et al. "Development of Indoor Navigation system for Humanoid Robot Using Multi-sensors Integration", ION NTM, San Diego, CA pp. 798-805, Jan 22-24, 2007.
Leonard et al. "Mobile Robot Localization by tracking Geometric Beacons", IEEE Transaction on Robotics and Automation, vol. 7, No. 3 pp. 376-382, Jun. 1991.
Li et al "Making a Local Map of Indoor Environments by Swiveling a Camera and a Sonar", Proceedings of the 1999 IEEE/RSJ International Conference on Intelligent Robots and Systems, pp. 954-959, 1999.
Lin, et al.. "Mobile Robot Navigation Using Artificial Landmarks", Journal of robotics System 14(2). pp. 93-106, 1997.
Linde "Dissertation, On Aspects of Indoor Localization" https://eldorado.tu-dortmund.de/handle/2003/22854, University of Dortmund, 138 pages, Aug. 28, 2006.
Lumelsky, et al. "An Algorithm for Maze Searching with Azimuth Input", 1994 IEEE International Conference on Robotics and Automation, San Diego, CA vol. 1, pp. 111-116, 1994.
Luo et al., "Real-time Area-Covering Operations with Obstacle Avoidance for Cleaning Robots," 2002, IEeE, p. 2359-2364.
Ma "Thesis: Documentation on Northstar", California Institute of Technology, 14 pages, May 17, 2006.
Madsen et al. "Optimal landmark selection for triangulation of robot position", Journal of Robotics and Autonomous Systems vol. 13 pp. 277-292, 1998.
Matsutek Enterprises Co. Ltd "Automatic Rechargeable Vacuum Cleaner", http://matsutek.manufacturer.globalsources.com/si/6008801427181/pdtl/Home-vaccum/10 . . . , Apr. 23, 2007.
McGillem, et al. "Infra-red Lacation System for Navigation and Autonomous Vehicles", 1998 IEEE International Conference on Robotics and Automation, vol. 2, pp. 1236-1238, Apr. 24-29, 1988.
McGillem,et al. "A Beacon Navigation Method for Autonomous Vehicles", IEEE Transactions on Vehicular Technology, vol. 38, No. 3, pp. 132-139, Aug. 1989.
Michelson "Autonomous Navigation", 2000 Yearbook of Science & Technology, McGraw-Hill, New York, ISBN 0-07-052771-7, pp. 28-30, 1999.
Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.
MobileMag "Samsung Unveils High-tech Robot Vacuum Cleaner", http://www.mobilemag.com/content/100/102/C2261/, 4 pages, Mar. 18, 2005.
Monteiro, et al. "Visual Servoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.
Moore, et al. A simple Map-bases Localization strategy using range measurements, SPIE vol. 5804 pp. 612-620, 2005.
Munich et al. "SIFT-ing Through Features with ViPR", IEEE Robotics & Automation Magazine, pp. 72-77, Sep. 2006.
Munich et al. "ERSP: A Software Platform and Architecture for the Service Robotics Industry", Intelligent Robots and Systems, 2005. (IROS 2005), pp. 460-467, Aug. 2-6, 2005.
Nam, et al. "Real-Time Dynamic Visual Tracking Using PSD Sensors and extended Trapezoidal Motion Planning", Applied Intelligence 10, pp. 53-70, 1999.
Nitu et al. "Optomechatronic System for Position Detection of a Mobile Mini-Robot", IEEE Ttransactions on Industrial Electronics, vol. 52, No. 4, pp. 969-973, Aug. 2005.
On Robo "Robot Reviews Samsung Robot Vacuum (VC-RP30W)", www.onrobo.com/reviews/AT_Home/vacuum_cleaners/on00vcrb30rosam/index.htm.. 2 pages, 2005.
InMach "Intelligent Machines", www.inmach.de/inside.html, 1 page, Nov. 19, 2008.
Innovation First "2004 EDU Robot Controller Reference Guide", http://www.ifirobotics.com, 13 pgs., Mar. 1, 2004.
OnRobo "Samsung Unveils Its Multifunction Robot Vacuum", www.onrobo.com/enews/0210/samsung_vacuum.shtml, 3 pages, Mar. 18, 2005.
Pages et al. "Optimizing Plane-to-Plane Positioning Tasks by Image-Based Visual Servoing and Structured Light", IEEE Transactions on Robotics, vol. 22, No. 5. pp. 1000-1010, Oct. 2006.
Pages et al. "A camera-projector system for robot positioning by visual servoing", Proceedings of the 2006 Conference on Computer Vision and Pattern Recognition Workshop (CVPRW06), 8 pages, Jun. 17-22, 2006.
Pages, et al. "Robust decoupled visual servoing based on structured light", 2005 IEEE/RSJ Int. Conf. on Intelligent Robots and Systems, pp. 2676-2681, 2005.
Park et al. "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun. 27-Jul. 2, 1994.
Park, et al. "Dynamic Visual Servo Control of Robot Manipulators using Neutral Networks", The Korean Institute Telematics and Electronics, vol. 29-B, No. 10. pp. 771-779, Oct. 1992.
Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).
Penna, et al. "Models for Map Building and Navigation", IEEE Transactions on Systems. Man. And Cybernetics, vol. 23 No. 5, pp. 1276-1301. Sep./Oct. 1993.
Pirjanian "Reliable Reaction", Proceedings of the 1996 IEEE/SICE/RSJ International Conference on Multisensor Fusion and Integration for Intelligent Systems, pp. 158-165, 1996.
Pirjanian "Challenges for Standards for consumer Robotics", IEEE Workshop on Advanced Robotics and its Social impacts, pp. 260-264, Jun. 12-15, 2005.
Pirjanian et al. "Distributed Control for a Modular, Reconfigurable Cliff Robot", Proceedings of the 2002 IEEE International Conference on Robotics & Automation, Washington, D.C. pp. 4083-4088, May 2002.
Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.
Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.
Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106. Nov. 8-9, 1999.
Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
Prassler et al., "A Short History of Cleaning Robots", Autonomous Robots 9, 211-226, 2000, 16 pages.
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001).
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Maiik et al. "Virtual Prototyping for Conceptual Design of a Tracked Mobile Robot". Electrical and Computer Engineering, Canadian Conference on, IEEE, Pl. May 1, 2006, pp. 2349-2352.

Sahin, et al. "Development of a Visual Object Localization Module for Mobile Robots", 1999 Third European Workshop on Advanced Mobile Robots, (Eurobot '99), pp. 65-72, 1999.

Salomon, et al. "Low-Cost Optical Indoor Localization system for Mobile Objects without Image Processing", IEEE Conference on Emerging Technologies and Factory Automation, 2006. (ETFA '06). pp. 629-632, Sep. 20-22, 2006.

Sato "Range Imaging Based on Moving Pattern Light and Spatio-Temporal Matched Filter", Proceedings International Conference on Image Processing, vol. 1., Lausanne, Switzerland. pp. 33-36, Sep. 16-19, 1996.

Schenker, et al. "Lightweight rovers for Mars science exploration and sample return", Intelligent Robots and Computer Vision XVI, SPIE Proc. 3208, pp. 24-36, 1997.

Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.

Sim, et al "Learning Visual Landmarks for Pose Estimation", IEEE International Conference on Robotics and Automation, vol. 3, Detroit, MI, pp. 1972-1978, May 10-15, 1999.

Sobh et al. "Case Studies in Web-Controlled Devices and Remote Manipulation", Automation Congress, 2002 Proceedings of the 5th Biannual World, pp. 435-440, Dec. 10, 2002.

Stella, et al. "Self-Location for Indoor Navigation of Autonomous Vehicles", Part of the SPIE conference on Enhanced and Synthetic Vision SPIE vol. 3364 pp. 298-302, 1998.

Summet "Tracking Locations of Moving Hand-held Displays Using Projected Light", Pervasive 2005, LNCS 3468 pp. 37-46 (2005).

Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.

Takio et al. "Real-Time Position and Pose Tracking Method of Moving Object Using Visual Servo System", 47th IEEE International Symposium on Circuits and Systems, pp. 167-170, 2004.

Teller "Pervasive pose awareness for people, Objects and Robots", http://www.ai.mit.edu/lab/dangerous-ideas/Spring2003/teller-pose.pdf, 6 pages, Apr. 30, 2003.

Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.

The Sharper Image "Robotic Vacuum Cleaner—Blue" www.Sharperimage.com, 2 pages, Mar. 18, 2005.

The Sharper Image "E Vac Robotic Vacuum", www.sharperiamge.com/us/en/templates/products/pipmorework1printable.jhtml, 2 pages, Mar. 18, 2005.

TheRobotStore.com "Friendly Robotics Vacuum RV400—The Robot Store", www.therobotstore.com/s.nl/sc.9/category.-109/it.A/id.43/.f, 1 page, Apr. 20, 2005.

TotalVac.com RC3000 RoboCleaner website Mar. 18, 2005.

Trebi-Ollennu et al. "Mars Rover Pair Cooperatively Transporting a Long Payload", Proceedings of the 2002 IEEE International Conference on Robotics & Automation, Washington, D.C. pp. 3136-3141, May 2002.

Trbelhorn et al., "Evaluating the Roomba; A low-cost, ubiquitous platform for robotics research and education," 2007, IEEE, p. 1393-1399.

Tse et al. "Design of a Navigation System for a Household Mobile Robot Using Neural Networks", Department of Manufacturing Engg. & Engg. Management, City University of Hong Kong, pp. 2151-2156, 1998.

UAMA (Asia) Industrial Co., Ltd. "RobotFamily", 2005.

Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.

Watts "Robot, boldly goes where no man can", The Times—pp. 20, Jan. 1985.

Wijk et al. "Triangulation-Based Fusion of Sonar Data with Application in Robot Pose Tracking", IEEE Transactions on Robotics and Automation, vol. 16, No. 6, pp. 740-752, Dec. 2000.

Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.

Wolf et al. "Robust Vision-Based Localization by Combining an Image-Retrieval System with Monte Carol Localization", IEEE Transactions on Robotics, vol. 21, No. 2. pp. 208-216, Apr. 2005.

Wong "EIED Online>> Robot Business", ED Online ID# 13114, 17 pages, Jul. 2006.

Yamamoto et al. "Optical Sensing for Robot Perception and Localization", 2005 IEEE Workshop on Advanced Robotics and its Social Impacts, pp. 14-17, 2005.

Yata et al. "Wall Following Using Angle Information Measured by a Single Ultrasonic Transducer", Proceedings of the 1998 IEEE, International Conference on Robotics & Automation, Leuven, Belgium, pp. 1590-1596, May, 1998.

Yun, et al. "Image-Based Absolute Positioning System for Mobile Robot Navigation", IAPR International Workshops SSPR, Hong Kong, pp. 261-269, Aug. 17-19, 2006.

Yun, et al. "Robust Positioning a Mobile Robot with Active Beacon Sensors", Lecture Notes in Computer Science, 2006, vol. 4251, pp. 690-897, 2006.

Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.

Zha et at. "Mobile Robot Localization Using Incomplete Maps for Change Detection in a Dynamic Environment", Advanced Intelligent Mechatronics '97. Final Program and Abstacts., IEEE/ASME International Conference, pp. 110, Jun. 16-20, 1997.

Zhang, et at. "A Novel Mobile Robot Localization Based on Vision", SPIE vol. 6279, 6 pages, Jan. 29, 2007.

Roboking—not just a vacuum cleaner, a robot! Jan. 21, 2004, 5 pages. Popco.net Make your digital life http://www.popco.net/zboard/view.php?id=tr_review no=40 accessed Nov. 1, 2011.

Matsumura Camera Online Shop http://www.rakuten.co.jp/matsucame/587179/711512/ accessed Nov. 1, 2011.

Dyson's Robot Vacuum Cleaner—the DC06, May 2, 2004 http://www.gizmag.com/go/1282/ accessed Nov. 11, 2011.

Electrolux Trilobite, Time to enjoy life, 38 pages http://www.robocon.co.kr/trilobite/Presentation_Trilobite_Kor_030104.ppt accessed Dec. 22, 2011.

Facts on the Trilobite http://www.frc.ri.cmu.edu/~hpm/talks/Extras/trilobite.desc.html 2 pages accessed Nov. 1, 2011.

Euroflex Jan. 1, 2006 http://www.euroflex.tv/novita_dett.php?id=15 1 page accessed Nov. 1, 2011.

Friendly Robotics, 18 pages http://www.robotsandrelax.com/PDFs/RV400Manual.pdf accessed Dec. 22, 2011.

It's eye, 2003 www.hitachi.co.jp/rd/pdf/topics/hitac2003_10.pdf 2 pages.

Hitachi, May 29, 2003 http://www.hitachi.co.jp/New/cnews/hl_030529_hl_030529.pdf 8 pages.

Robot Buying Guide, LG announces the first robotic vacuum cleaner for Korea, Apr. 21, 2003 http://robotbg.com/news/2003/04/22/lg_announces_the_first_robotic_vacu.

UBOT, cleaning robot capable of wiping with a wet duster, http://us.aving.net/news/view.php?articleId=23031, 4 pages accessed Nov. 1, 2011.

Taipei Times, Robotic vacuum by Matsuhita about ot undergo testing, Mar. 26, 2002 http://www.taipeitimes.com/News/worldbiz/archives/2002/03/26/0000129338 accessed.

Tech-on! http://techon.nikkeibp.co.jp/members/01db/200203/1006501/, 4 pages, accessed Nov. 1, 2011.

IT media http://www.itmedia.co.jp/news/0111/16/robofesta_m.html accessed Nov. 1, 2011.

Yujin Robotics, an intelligent cleaning robot 'iclebo Q' AVING USA http://us.aving.net/news/view.php?articleId=7257, 8 pages accessed Nov. 4, 2011.

Special Reports. Vacuum Cleaner Robot Operated in Conjunction with 3G Celluar Phone vol. 59, No. 9 (2004) 3 pages http://www.toshiba.co.jp/tech/review/2004/09/59_0.

Toshiba Corporation 2003, http://warp.ndl.go.jp/info:ndljp/pid/258151/www.soumu.go.jp/joho_tsusin/policyreports/chousa/netrobot/pdf/030214_1_33_a.pdf 16 pages.

http://www.karcher.de/versions/intg/assets/video/2_4_robo_en.swf. Accessed Sep. 25, 2009.

McLurkin "The Ants: A community of Microbots", Paper submitted for requirements of BSEE at MIT, May 12, 1995.

Grumet "Robots Clean House", Popular Mechanics, Nov. 2003.

McLurkin Stupid Robot Tricks: A Behavior-based Distributed Algorithm Library for Programming Swarms of Robots, Paper submitted for requirements of BSEE at MIT, May 2004.

Kurs et al, Wireless Power transfer via Strongly Coupled Magnetic Resonances, Downloaded from www.sciencemag.org, Aug. 17, 2007.

Hitachi "Feature", http://kadenfan.hitachi.co.jp/robot/feature/feature.html, 1 page Nov. 19, 2008.

Home Robot—UBOT; Microbotusa.com, retrieved from the WWW at www.microrobotusa.com, accessed Dec. 2, 2008.

Hitachi: News release: The home cleaning robot of the autonomous movement type (experimental machine) is developed, website: http://www.i4u.com/japanreleases/hitachirobot.htm., accessed Mar. 18, 2005.

Kärcher Product Manual Download webpage: "http://wwwkarcher-com/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004.

Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec 2002.

Kärcher RoboCleaner RC 3000 Product Details webpages: "http://wwwrobocleanerde/english/screen3html" through " . . . screen6html" accessed Dec. 12, 2003.

Karcher USA, RC3000 Robotic Cleaner, website: http://www.karcher-usa.com/showproducts.php?op=view_prod&param1=143&param2=&param3=, accessed Mar. 18, 2005.

Prassler, et al. A Short History of Cleaning Robots, Autonomous Robots 9, 211-226, 2000, 11 pages.

Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005.

Put Your Roomba . . . On "Automatic" webpages: "http://www.acomputeredge.com/roomba," accessed Apr. 20, 2005.

RoboMaid Sweeps Your Floors So You Won't Have to, the Official Site, website: http://www.thereobomaid.com/, acessed Mar. 18, 2005.

Robot Review Samsung Robot Vacuum (VC-RP3OW), website: http://www.onrobo.com/reviews/At_Home/Vacuun_Cleaners/on00verp30rosam/index.htm, accessed Mar. 18, 2005.

Robotic Vacuum Cleaner-Blue, website: http://www.sharperimage.com/us/en/catalog/productview.jhtml?sku=S1727BLU, accessed Mar. 18, 2005.

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.

Wired News: Robot Vacs Are in the House, website: http://www.wired.com/news/print/0,1294,59237,00.html, accessed Mar. 18, 2005.

http://robotbg.com/news/2003/04/22lg_announces_the_first_robotic_vacuum_cleaner_of_korea.

http://www.taipeitimes.com/News/worldbiz/archives/2002/03/26/0000129338.

http://www.sk.rs/1999/10/sknt01.html.

Examination report dated Oct. 18, 2011 for corresponding application No. 10183299.6.

Examination report dated Oct. 18, 2011 for corresponding application No. 10183338.2.

Examination report dated Oct. 18, 2011 for corresponding application No. 10183328.8.

EP Search report dated Sep. 5, 2011 for corresponding application 10183299.6.

EP Search report dated Sep. 5, 2011 for corresponding application 10183338.2.

EP Search report dated Sep. 5, 2011 for corresponding application 10183328.8.

Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95, pp. 548-551, 1995.

Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.

Becker, et al. "Reliable Navigation Using Landmarks" IEEE International Conference on Robotics and Automation, 0-7803-1965-6, pp. 401-406, 1995.

Benayad-Cherif, et al., "Mobile Robot Navigation Sensors" SPIE vol. 1831 Mobile Robots, VII. pp. 378-387, 1992.

Facchinetti, Claudio et al. "Using and Learning Vision-Based Self-Positioning for Autonomous Robot Navigation", ICARCV '94, vol. 3 pp. 1694-1698, 1994.

Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol.

Facchinetti, Claudio et al, "Self-Positioning Robot Navigation Using Ceiling Images Sequences", ACCV '95, 5 pages, Dec. 5-8, 1995.

Fairfield, Nathaniel et al. "Mobile Robot Localization with Sparse Landmarks", SPIE vol. 4573 pp. 148-155, 2002.

Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.

Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.

U.S. Appl. No. 60/605,066 as provided to WIPO in PCT/US2005/030422, corresponding to U.S. National Stage Entry U.S. Appl. No. 11/574,290, U.S. publication 2008/0184518, filed Aug. 27, 2004.

U.S. Appl. No. 60/605,181 as provided to WIPO in PCT/US2005/030422, corresponding to U.S. National Stage Entry U.S. Appl. No. 11/574,290, U.S. publication 2008/0184518, filed Aug. 27, 2004.

Derek Kurth, "Range-Only Robot Localization and Slam with Radio", http://www.ri.cmu.edu/pub_files/pub4/kurth_derek_2004_1/kurth_derek_2004_1.pdf. 60 pages, May 2004, accessed Jul. 27, 2012.

Electrolux Trilobite, Jan. 12, 2001, http://www.electrolux-ui.com:8080/2002%5C822%5C833102EN.pdf, accessed Jul. 2, 2012, 10 pages.

Florbot GE Plastics, 1989-1990, 2 pages, available at http://www.fuseid.com/, accessed Sep. 27, 2012.

Gregg et al., "Autonomous Lawn Care Applications," 2006 Florida Conference on Recent Advances in Robotics, Miami, Florida, May 25-26, 2006, Florida International University, 5 pages.

King and Weiman, "Helpmate™ Autonomous Mobile Robots Navigation Systems," SPIE vol. 1388 Mobile Robots, pp. 190-198 (1990).

Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.

Written Opinion of the International Searching Authority, PCT/US2004/001504, Aug. 20, 2012, 9 pages.

* cited by examiner

METHOD AND SYSTEM FOR MULTI-MODE COVERAGE FOR AN AUTONOMOUS ROBOT

CROSS REFERENCE TO RELATED APPLICATIONS

This U.S. patent application is a continuation of, and claims priority under 35 U.S.C. §120 from, U.S. patent application Ser. No. 11/671,305, filed on Feb. 5, 2007, which is a continuation of U.S. patent application Ser. No. 10/839,374, filed on May 5, 2004 now U.S. Pat. No. 7,173,391, which is a continuation of U.S. patent application Ser. No. 10/167,851, filed on Jun. 12, 2002 now U.S. Pat. No. 6,809,490, which claims priority under 35 U.S.C. §119(e) to U.S. Provisional Application 60/297,718, filed on Jun. 12, 2001. The disclosures of these prior applications are considered part of the disclosure of this application and are hereby incorporated by reference in their entireties.

FIELD OF THE INVENTION

This invention relates generally to autonomous vehicles or robots, and more specifically to methods and mobile robotic devices for covering a specific area as might be required of, or used as, robotic cleaners or lawn mowers.

DESCRIPTION OF PRIOR ART

For purposes of this description, examples will focus on the problems faced in the prior art as related to robotic cleaning (e.g., dusting, buffing, sweeping, scrubbing, dry mopping or vacuuming). The claimed invention, however, is limited only by the claims themselves, and one of skill in the art will recognize the myriad of uses for the present invention beyond indoor, domestic cleaning.

Robotic engineers have long worked on developing an effective method of autonomous cleaning. By way of introduction, the performance of cleaning robots should concentrate on three measures of success: coverage, cleaning rate and perceived effectiveness. Coverage is the percentage of the available space visited by the robot during a fixed cleaning time, and ideally, a robot cleaner would provide 100 percent coverage given an infinite run time. Unfortunately, designs in the prior art often leave portions of the area uncovered regardless of the amount of time the device is allowed to complete its tasks. Failure to achieve complete coverage can result from mechanical limitations—e.g., the size and shape of the robot may prevent it from reaching certain areas—or the robot may become trapped, unable to vary its control to escape. Failure to achieve complete coverage can also result from an inadequate coverage algorithm. The coverage algorithm is the set of instructions used by the robot to control its movement. For the purposes of the present invention, coverage is discussed as a percentage of the available area visited by the robot during a finite cleaning time. Due to mechanical and/or algorithmic limitations, certain areas within the available space may be systematically neglected. Such systematic neglect is a significant limitation in the prior art.

A second measure of a cleaning robot's performance is the cleaning rate given in units of area cleaned per unit time. Cleaning rate refers to the rate at which the area of cleaned floor increases; coverage rate refers to the rate at which the robot covers the floor regardless of whether the floor was previously clean or dirty. If the velocity of the robot is v and the width of the robot's cleaning mechanism (also called work width) is w then the robot's coverage rate is simply wv, but its cleaning rate may be drastically lower.

A robot that moves in a purely randomly fashion in a closed environment has a cleaning rate that decreases relative to the robot's coverage rate as a function of time. This is because the longer the robot operates the more likely it is to revisit already cleaned areas. The optimal design has a cleaning rate equivalent to the coverage rate, thus minimizing unnecessary repeated cleanings of the same spot. In other words, the ratio of cleaning rate to coverage rate is a measure of efficiency and an optimal cleaning rate would mean coverage of the greatest percentage of the designated area with the minimum number of cumulative or redundant passes over an area already cleaned.

A third metric of cleaning robot performance is the perceived effectiveness of the robot. This measure is ignored in the prior art. Deliberate movement and certain patterned movement is favored as users will perceive a robot that contains deliberate movement as more effective.

While coverage, cleaning rate and perceived effectiveness are the performance criteria discussed herein, a preferred embodiment of the present invention also takes into account the ease of use in rooms of a variety of shapes and sizes (containing a variety of unknown obstacles) and the cost of the robotic components. Other design criteria may also influence the design, for example the need for collision avoidance and appropriate response to other hazards.

As described in detail in Jones, Flynn & Seiger, *Mobile Robots: Inspiration to Implementation* second edition, 1999, A K Peters, Ltd., and elsewhere, numerous attempts have been made to build vacuuming and cleaning robots. Each of these robots has faced a similar challenge: how to efficiently cover the designated area given limited energy reserves.

We refer to maximally efficient cleaning, where the cleaning rate equals the coverage rate, as deterministic cleaning. As shown in FIG. 1A, a robot 1 following a deterministic path moves in such a way as to completely cover the area 2 while avoiding all redundant cleaning. Deterministic cleaning requires that the robot know both where it is and where it has been; this in turn requires a positioning system. Such a positioning system—a positioning system suitably accurate to enable deterministic cleaning might rely on scanning laser rangers, ultrasonic transducers, carrier phase differential GPS, or other methods—can be prohibitively expensive and involve user set-up specific to the particular room geometries. Also, methods that rely on global positioning are typically incapacitated by the failure of any part of the positioning system.

One example of using highly sophisticated (and expensive) sensor technologies to create deterministic cleaning is the RoboScrub device built by Denning Mobile Robotics and Windsor Industries, which used sonar, infrared detectors, bump sensors and high-precision laser navigation. RoboScrub's navigation system required attaching large bar code targets at various positions in the room. The requirement that RoboScrub be able to see at least four targets simultaneously was a significant operational problem. RoboScrub, therefore, was limited to cleaning large open areas.

Another example, RoboKent, a robot built by the Kent Corporation, follows a global positioning strategy similar to RobotScrub. RoboKent dispenses with RobotScrub's more expensive laser positioning system but having done so RoboKent must restrict itself only to areas with a simple rectangular geometry, e.g. long hallways. In these more constrained regions, position correction by sonar ranging measurements is sufficient. Other deterministic cleaning systems are described, for example, in U.S. Pat. No. 4,119,900 (Kremnitz), U.S. Pat. No. 4,700,427 (Knepper), U.S. Pat. No. 5,353, 224 (Lee et al.), U.S. Pat. No. 5,537,017 (Feiten et al.), U.S. Pat. No. 5,548,511 (Bancroft), U.S. Pat. No. 5,650,702 (Azumi).

Because of the limitations and difficulties of deterministic cleaning, some robots have relied on pseudo-deterministic schemes. One method of providing pseudo-deterministic cleaning is an autonomous navigation method known as dead reckoning. Dead reckoning consists of measuring the precise rotation of each robot drive wheel (using for example optical shaft encoders). The robot can then calculate its expected position in the environment given a known starting point and orientation. One problem with this technique is wheel slippage. If slippage occurs, the encoder on that wheel registers a wheel rotation even though that wheel is not driving the robot relative to the ground. As shown in FIG. 1B, as the robot 1 navigates about the room, these drive wheel slippage errors accumulate making this type of system unreliable for runs of any substantial duration. (The path no longer consists of tightly packed rows, as compared to the deterministic coverage shown in FIG. 1A.) The result of reliance on dead reckoning is intractable systematic neglect; in other words, areas of the floor are not cleaned.

One example of a pseudo-deterministic a system is the Cye robot from Probotics, Inc. Cye depends exclusively on dead reckoning and therefore takes heroic measures to maximize the performance of its dead reckoning system. Cye must begin at a user-installed physical registration spot in a known location where the robot fixes its position and orientation. Cye then keeps track of position as it moves away from that spot. As Cye moves, uncertainty in its position and orientation increase. Cye must make certain to return to a calibration spot before this error grows so large that it will be unlikely to locate a calibration spot. If a calibration spot is moved or blocked or if excessive wheel slippage occurs then Cye can become lost (possibly without realizing that it is lost). Thus Cye is suitable for use only in relatively small benign environments. Other examples of this approach are disclosed in U.S. Pat. No. 5,109,566 (Kobayashi et al.) and U.S. Pat. No. 6,255,793 (Peless et al.).

Another approach to robotic cleaning is purely random motion. As shown in FIG. 1C, in a typical room without obstacles, a random movement algorithm will provide acceptable coverage given significant cleaning time. Compared to a robot with a deterministic algorithm, a random cleaning robot must operate for a longer time to achieve acceptable coverage. To have high confidence that the random-motion robot has cleaned 98% of an obstacle-free room, the random motion robot must run approximately five times as long as a deterministic robot with the same cleaning mechanism moving at the same speed.

The coverage limitations of a random algorithm can be seen in FIG. 1D. An obstacle 5 in the room can create the effect of segmenting the room into a collection of chambers. The coverage over time of a random algorithm robot in such a room is analogous to the time density of gas released in one chamber of a confined volume. Initially, the density of gas is highest in the chamber where it is released and lowest in more distant chambers. Similarly the robot is most likely to thoroughly clean the chamber where it starts, rather than more distant chambers, early in the process. Given enough time a gas reaches equilibrium with equal density in all chambers. Likewise given time, the robot would clean all areas thoroughly. The limitations of practical power supplies, however, usually guarantee that the robot will have insufficient time to clean all areas of a space cluttered with obstacles. We refer to this phenomenon as the robot diffusion problem.

As discussed, the commercially available prior art has not been able to produce an effective coverage algorithm for an area of unknown geometry. As noted above, the prior art either has relied on sophisticated systems of markers or beacons or has limited the utility of the robot to rooms with simple rectangular geometries. Attempts to use pseudo-deterministic control algorithms can leave areas of the space systematically neglected.

OBJECTS AND ADVANTAGES

It is an object of the present invention to provide a system and method to allow a mobile robot to operate in a plurality of modes in order to effectively cover an area.

It is an object of the present invention to provide a mobile robot, with at least one sensor, to operate in a number of modes including spot-coverage, obstacle following and bounce.

It is a further object of the invention to provide a mobile robot that alternates between obstacle following and bounce mode to ensure coverage.

It is an object of the invention to return to spot-coverage after the robot has traveled a pre-determined distance.

It is an object of the invention to provide a mobile robot able to track the average distance between obstacles and use the average distance as an input to alternate between operational modes.

It is yet another object of the invention to optimize the distance the robot travels in an obstacle following mode as a function of the frequency of obstacle following and the work width of the robot, and to provide a minimum and maximum distance for operating in obstacle following mode.

It is an object of a preferred embodiment of the invention to use a control system for a mobile robot with an operational system program able to run a plurality of behaviors and using an arbiter to select which behavior is given control over the robot.

It is still another object of the invention to incorporate various escape programs or behavior to allow the robot to avoid becoming stuck.

Finally, it is an object of the invention to provide one or more methods for controlling a mobile robot to benefit from the various objects and advantages disclosed herein.

BRIEF DESCRIPTION OF THE DRAWINGS

These and further features of the present invention will be apparent with reference to the accompanying drawings, wherein.

DESCRIPTION OF INVENTION

In the present invention, a mobile robot is designed to provide maximum coverage at an effective coverage rate in a room of unknown geometry. In addition, the perceived effectiveness of the robot is enhanced by the inclusion of patterned or deliberate motion. In addition, in a preferred embodiment, effective coverage requires a control system able to prevent the robot from becoming immobilized in an unknown environment.

Figure 1A:
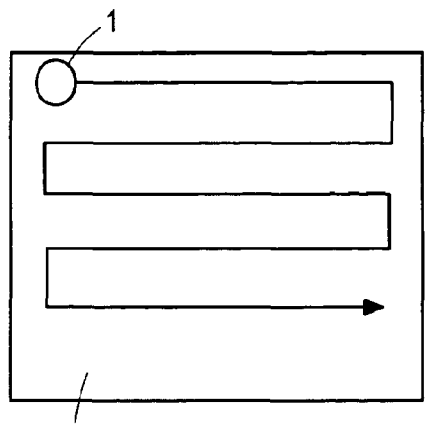
FIGS. 1A-D illustrate coverage patterns of various robots in the prior art.
Figure 1B:
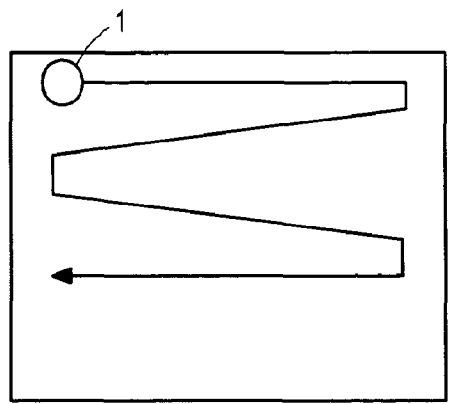
Figure 1C:
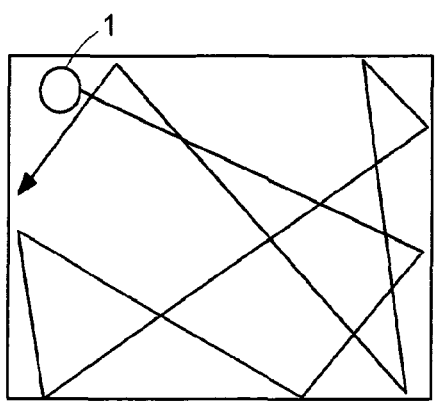
Figure 1D:
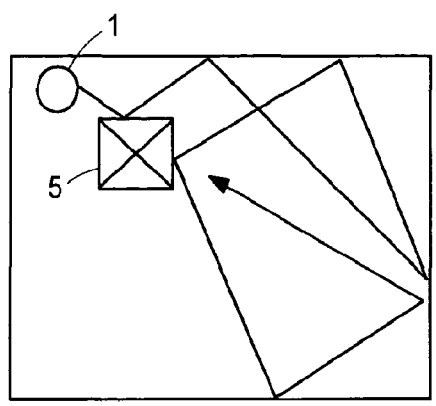
Figure 2:
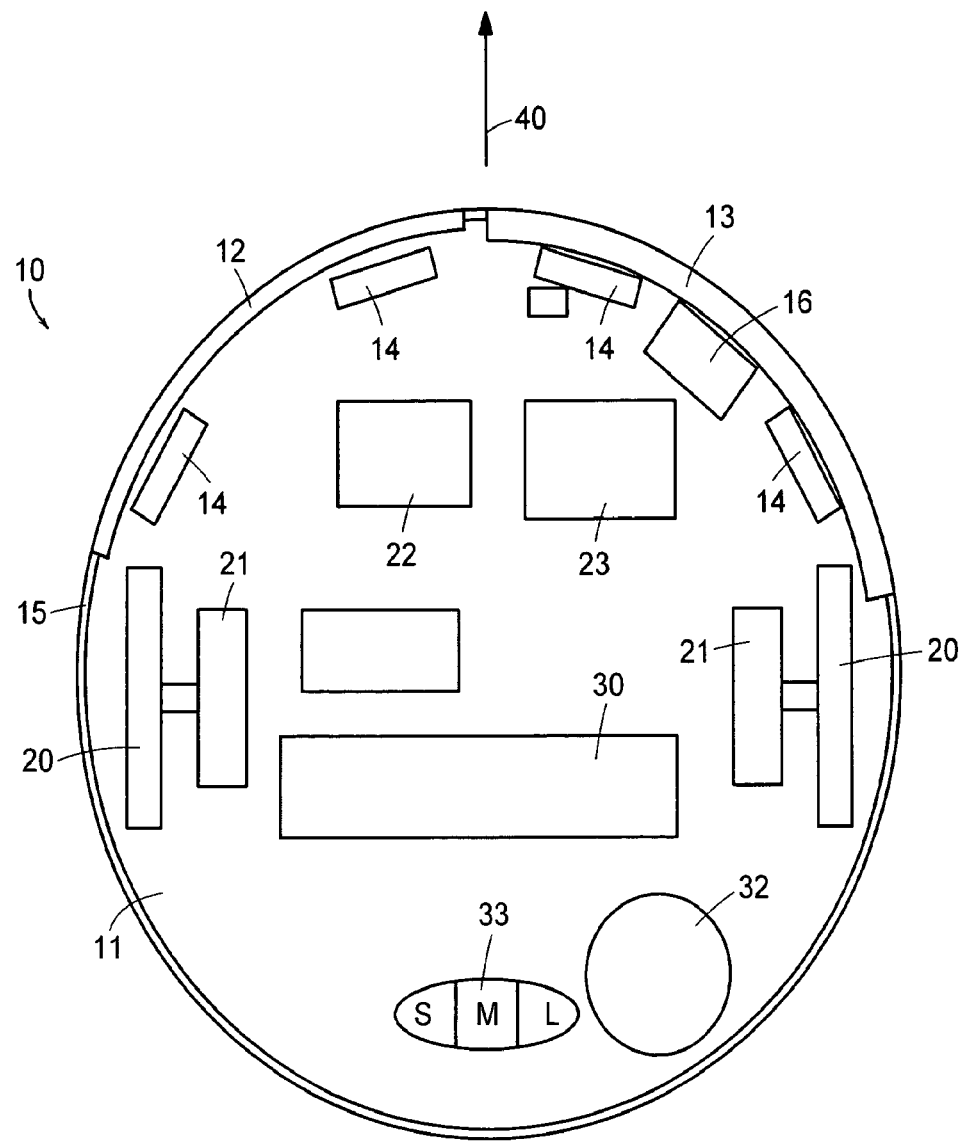
FIG. 2 is a top-view schematic representation of the basic components of a mobile robot used in a preferred embodiment of the invention.

While the physical structures of mobile robots are known in the art, the components of a preferred, exemplary embodiment of the present invention is described herein. A preferred embodiment of the present invention is a substantially circular robotic sweeper containing certain features. As shown in FIG. 2, for example, the mobile robot 10 of a preferred embodiment includes a chassis 11 supporting mechanical and electrical components. These components include various sensors, including two bump sensors 12 & 13 located in the forward portion of the robot, four cliff sensors 14 located on the robot shell 15, and a wall following sensor 16 mounted on the robot shell 15. In other embodiments, as few as one sensor may be used in the robot. One of skill in the art will recognize that the sensor(s) may be of a variety of types including sonar, tactile, electromagnetic, capacitive, etc. Because of cost restraints, a preferred embodiment of the present invention uses bump (tactile) sensors 12 & 13 and reflective IR proximity sensors for the cliff sensors 14 and the wall-following sensor 16. Details of the IR sensors are described in U.S. patent application Ser. No. 09/768,773, which disclosure is hereby incorporated by reference.

A preferred embodiment of the robot also contains two wheels 20, motors 21 for driving the wheels independently, an inexpensive low-end microcontroller 22, and a rechargeable battery 23 or other power source known in the art. These components are well known in the art and are not discussed in detail herein. The robotic cleaning device 10 further includes one or more cleaning heads 30. The cleaning head might contain a vacuum cleaner, various brushes, sponges, mops, electrostatic cloths or a combination of various cleaning elements. The embodiment shown in FIG. 2 also includes a side brush 32.

As mentioned above, a preferred embodiment of the robotic cleaning device 10 comprises an outer shell 15 defining a dominant side, non-dominant side, and a front portion of the robot 10. The dominant side of the robot is the side that is kept near or in contact with an object (or obstacle) when the robot cleans the area adjacent to that object (or obstacle). In a preferred embodiment, as shown in FIG. 1, the dominant side of the robot 10 is the right-hand side relative to the primary direction of travel, although in other embodiments the dominant side may be the left-hand side. In still other embodiments, the robot may be symmetric and thereby does not need a dominant side; however, in a preferred embodiment, a dominant side is chosen for reasons of cost. The primary direction of travel is as shown in FIG. 2 by arrow 40.

In a preferred embodiment, two bump sensors 12 & 13 are located forward of the wheels 20 relative to the direction of forward movement, shown by arrow 40. One bump sensor 13 is located on the dominant side of the robot 10 and the other bump sensor 12 is located on the non-dominant side of the robot 10. When both of these bump sensors 12 & 13 are activated simultaneously, the robot 10 recognizes an obstacle in the front position. In other embodiments, more or fewer individual bump sensors can be used. Likewise, any number of bump sensors can be used to divide the device into any number of radial segments. While in a preferred embodiment the bump sensors 12 & 13 are IR break beam sensors activated by contact between the robot 10 and an obstacle, other types of sensors can be used, including mechanical switches and capacitive sensors that detect the capacitance of objects touching the robot or between two metal plates in the bumper that are compressed on contact. Non-contact sensors, which allow the robot to sense proximity to objects without physically touching the object, such as capacitive sensors or a curtain of IR light, can also be used.

It is useful to have a sensor or sensors that are not only able to tell if a surface has been contacted (or is nearby), but also the angle relative to the robot at which the contact was made. In the case of a preferred embodiment, the robot is able to calculate the time between the activation of the right and left bump switches 12 & 13, if both are activated. The robot is then able to estimate the angle at which contact was made. In a preferred embodiment shown in FIG. 4A, the bump sensor comprises a single mechanical bumper 44 at the front of the robot with sensors 42 & 43 substantially at the two ends of the bumper that sense the movement of the bumper. When the bumper is compressed, the timing between the sensor events is used to calculate the approximate angle at which the robot contacted the obstacle. When the bumper is compressed from the right side, the right bump sensor detects the bump first, followed by the left bump sensor, due to the compliance of the bumper and the bump detector geometry. This way, the bump angle can be approximated with only two bump sensors.

Figure 4A:
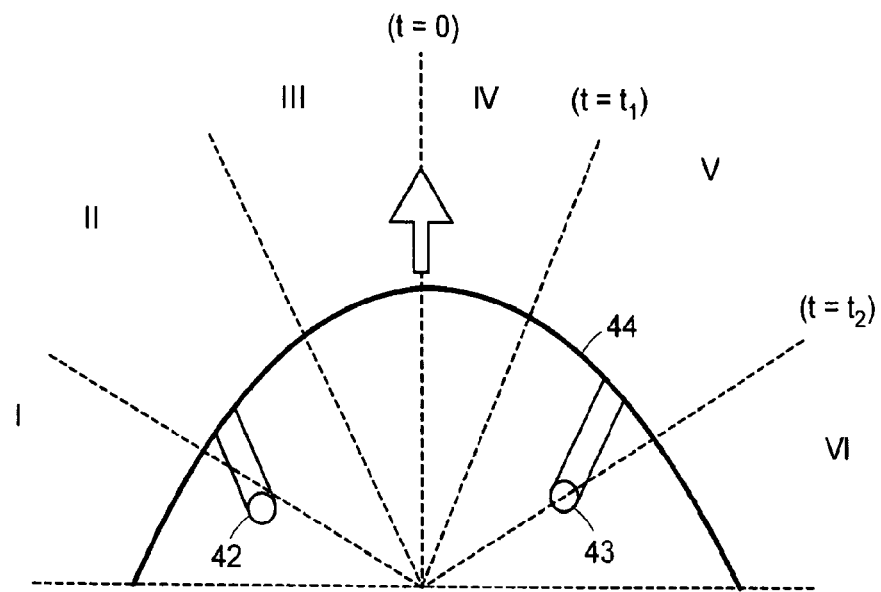
FIG. 4A is a diagram showing a method of determining the angle at which the robot encounters an obstacle.

For example, in FIG. 4A, bump sensors 42 & 43 are able to divide the forward portion of the robot into six regions (I-VI). When a bump sensor is activated, the robot calculates the time before the other sensor is activated (if at all). For example, when the right bump sensor 43 is activated, the robot measures the time (t) before the left bump sensor 42 is activated. If t is less than $t_1$, then the robot assumes contact occurred in region IV. If t is greater than or equal to $t_1$ and less than $t_2$, then the robot assumes contact was made in region V. If t is greater than or equal to $t_2$ (including the case of where the left bump sensor 42 is not activated at all within the time monitored), then the robot assumes the contact occurred in region VI. If the bump sensors are activated simultaneously, the robot assumes the contact was made from straight ahead. This method can be used the divide the bumper into an arbitrarily large number of regions (for greater precision) depending on of the timing used and geometry of the bumper. As an extension, three sensors can be used to calculate the bump angle in three dimensions instead of just two dimensions as in the preceding example.

A preferred embodiment also contains a wall-following or wall-detecting sensor 16 mounted on the dominant side of the robot 10. In a preferred embodiment, the wall following sensor is an IR sensor composed of an emitter and detector pair collimated so that a finite volume of intersection occurs at the expected position of the wall. This focus point is approximately three inches ahead of the drive wheel in the direction of robot forward motion. The radial range of wall detection is about 0.75 inches.

A preferred embodiment also contains any number of IR cliff sensors 14 that prevent the device from tumbling over stairs or other vertical drops. These cliff sensors are of a construction similar to that of the wall following sensor but directed to observe the floor rather than a wall. As an additional safety and sensing measure, the robot 10 includes a wheel-drop sensor that is able to detect if one or more wheels is unsupported by the floor. This wheel-drop sensor can therefore detect not only cliffs but also various obstacles upon which the robot is able to drive, such as lamps bases, high floor transitions, piles of cords, etc.

Other embodiments may use other known sensors or combinations of sensors.

Figure 3:
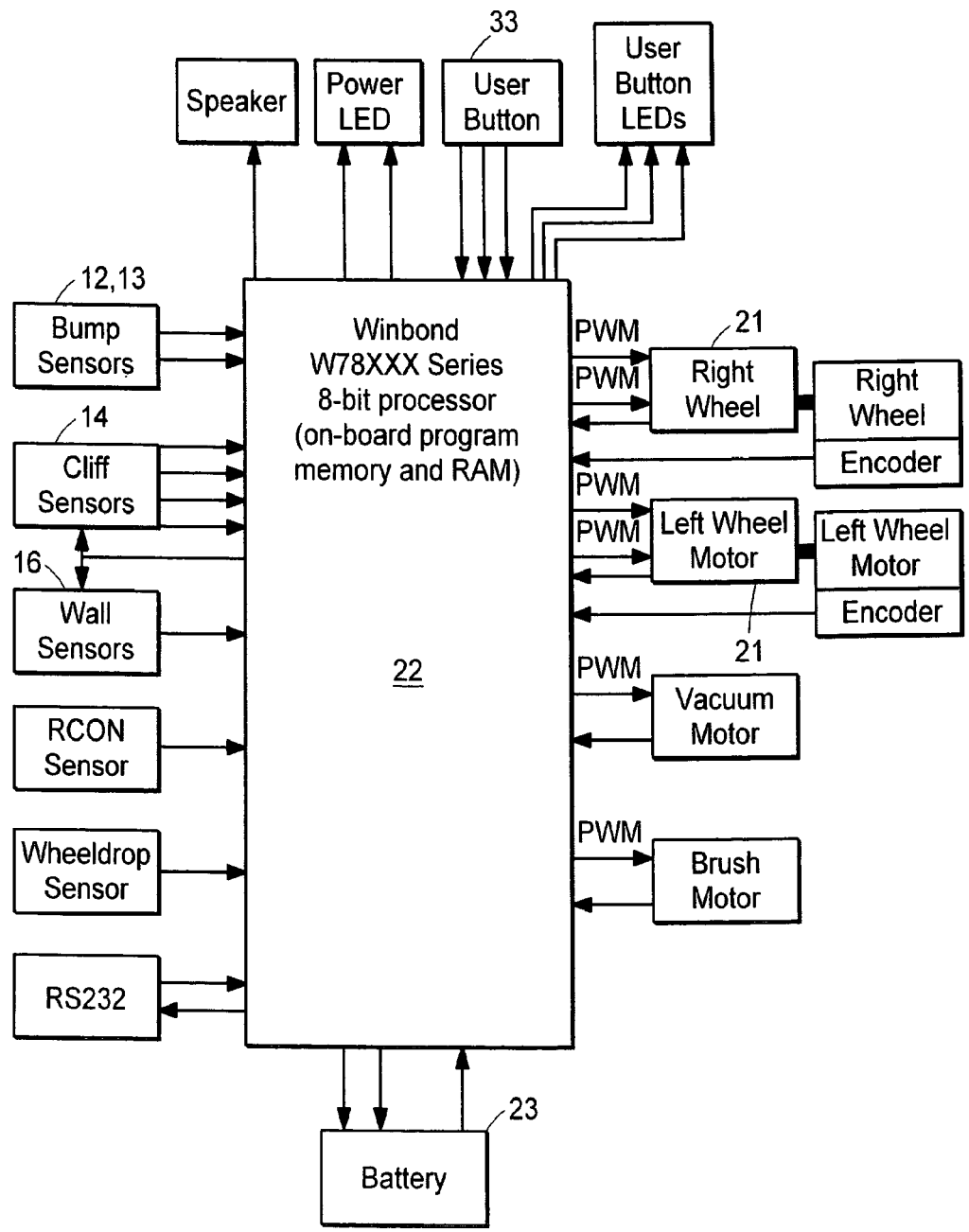
FIG. 3 demonstrates a hardware block diagram of the robot shown in FIG. 2.

FIG. 3 shows a hardware block diagram of the controller and robot of a preferred embodiment of the invention. In a preferred embodiment, a Winbond W78XXX series processor is used. It is a microcontroller compatible with the MCS-51 family with 36 general purpose I/O ports, 256 bytes of RAM and 16K of ROM. It is clocked at 40 MHz which is divided down for a processor speed of 3.3 MHz. It has two timers which are used for triggering interrupts used to process sensors and generate output signals as well as a watchdog timer. The lowest bits of the fast timer are also used as approximate random numbers where needed in the behaviors. There are also two external interrupts which are used to capture the encoder inputs from the two drive wheels. The processor also has a UART which is used for testing and debugging the robot control program.

The I/O ports of the microprocessor are connected to the sensors and motors of the robot and are the interface connecting it to the internal state of the robot and its environment. For example, the wheel drop sensors are connected to an input port and the brush motor PWM signal is generated on an output port. The ROM on the microprocessor is used to store the coverage and control program for the robot. This includes the behaviors (discussed below), sensor processing algorithms and signal generation. The RAM is used to store the active state of the robot, such as the average bump distance, run time and distance, and the ID of the behavior in control and its current motor commands.

Figure 4B:
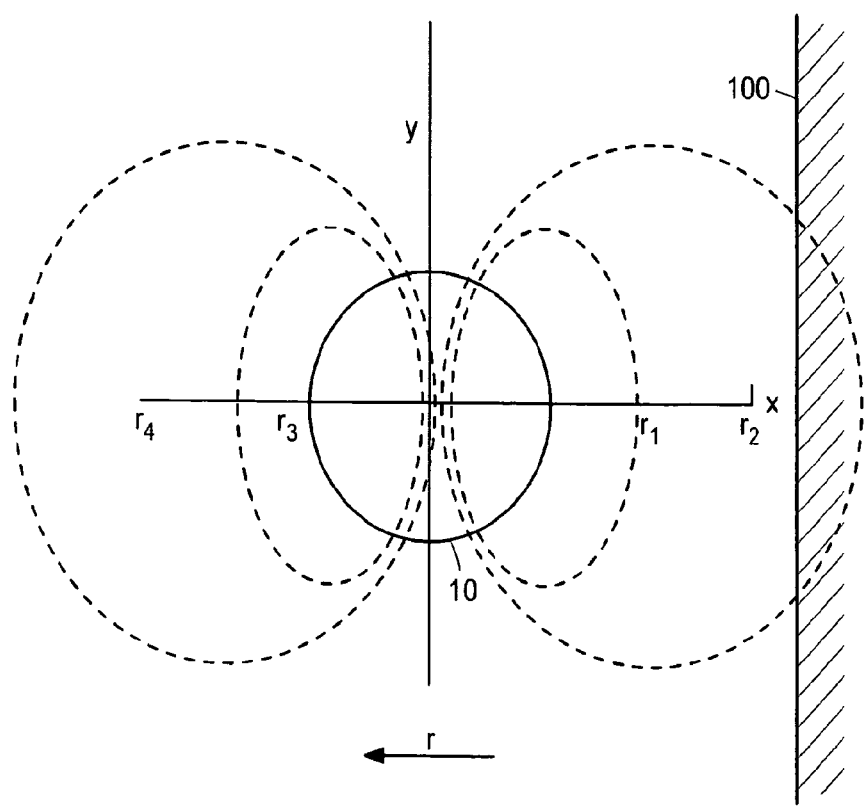
FIG. 4B is a diagram showing the orientation of a preferred embodiment of the robot control system.

For purposes of understanding the movement of the robotic device, FIG. 4B shows the orientation of the robot 10 centered about the x and y axes in a coordinate plane; this coordinate system is attached to the robot. The directional movement of the robot 10 can be understood to be the radius at which the robot 10 will move. In order to rapidly turn away from the wall 100, the robot 10 should set a positive, small value of r ($r_3$ in FIG. 4B); in order to rapidly turn toward the wall, the robot should set a negative, small value of r ($r_1$ in FIG. 4B). On the other hand, to make slight turns, the robot should set larger absolute values for r—positive values to move left (i.e. away from the wall, $r_4$ in FIG. 4B) and negative values to move right (i.e. toward the wall, ($r_2$ in FIG. 4B). This coordinate scheme is used in the examples of control discussed below. The microcontroller 22 controlling differential speed at which the individual wheel motors 21 are run, determines the turning radius.

Also, in certain embodiments, the robot may include one or more user inputs. For example, as shown in FIG. 2, a preferred embodiment includes three simple buttons 33 that Hallow the user to input the approximate size of the surface to be covered. In a preferred embodiment, these buttons labeled "small", "medium", and "large" correspond respectively to rooms of 11.1, 20.8 and 27.9 square meters.

As mentioned above, the exemplary robot is a preferred embodiment for practicing the instant invention, and one of skill in the art is able to choose from elements known in the art to design a robot for a particular purpose. Examples of suitable designs include those described in the following U.S. Pat. No. 4,306,329 (Yokoi), U.S. Pat. No. 5,109,566 (Kobayashi et al.), U.S. Pat. No. 5,293,955 (Lee), U.S. Pat. No. 5,369,347 (Yoo), U.S. Pat. No. 5,440,216 (Kim), U.S. Pat. No. 5,534,762 (Kim), U.S. Pat. No. 5,613,261 (Kawakami et al), U.S. Pat. No. 5,634,237 (Paranjpe), U.S. Pat. No. 5,781,960 (Kilstrom et al.), U.S. Pat. No. 5,787,545 (Colens), U.S. Pat. No. 5,815,880 (Nakanishi), U.S. Pat. No. 5,839,156 (Park et al.), U.S. Pat. No. 5,926,909 (McGee), U.S. Pat. No. 6,038,501 (Kawakami), U.S. Pat. No. 6,076,226 (Reed), all of which are hereby incorporated by reference.

Figure 5:
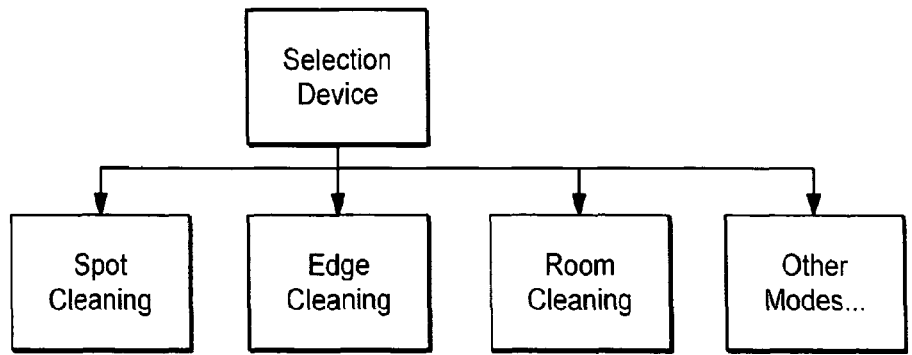
FIG. 5 is a schematic representation of the operational modes of the instant invention.

FIG. 5 shows a simple block representation of the various operational modes of a device. In a preferred embodiment, and by way of example only, operational modes may include spot cleaning (where the user or robot designates a specific region for cleaning), edge cleaning, and room cleaning. Each operational mode comprises complex combinations of instructions and/or internal behaviors, discussed below. These complexities, however, are generally hidden from the user. In one embodiment, the user can select the particular operational mode by using an input element, for example, a selector switch or push button. In other preferred embodiments, as described below, the robot is able to autonomously cycle through the operational modes.

The coverage robot of the instant invention uses these various operational modes to effectively cover the area. While one of skill in the art may implement these various operational modes in a variety of known architectures, a preferred embodiment relies on behavior control. Here, behaviors are simply layers of control systems that all run in parallel. The microcontroller 22 then runs a prioritized arbitration scheme to resolve the dominant behavior for a given scenario. A description of behavior control can be found in *Mobile Robots*, supra, the text of which is hereby incorporated by reference.

In other words, in a preferred embodiment, the robot's microprocessor and control software run a number of behaviors simultaneously. Depending on the situation, control of the robot will be given to one or more various behaviors. For purposes of detailing the preferred operation of the present invention, the behaviors will be described as (1) coverage behaviors, (2) escape behaviors or (3) user/safety behaviors. Coverage behaviors are primarily designed to allow the robot to perform its coverage operation in an efficient manner. Escape behaviors are special behaviors that are given priority when one or more sensor inputs suggest that the robot may not be operating freely. As a convention for this specification, behaviors discussed below are written in all capital letters.

1. Coverage Behaviors

FIGS. 6-14 show the details of each of the preferred operational modes: Spot Coverage, Wall Follow (or Obstacle Follow) and Room Coverage.

Operational Mode: Spot Coverage

Spot coverage or, for example, spot cleaning allows the user to clean an isolated dirty area. The user places the robot 10 on the floor near the center of the area (see reference numeral 40 in FIGS. 6A, 6B) that requires cleaning and selects the spot-cleaning operational mode. The robot then moves in such a way that the immediate area within, for example, a defined radius, is brought into contact with the cleaning head 30 or side brush 32 of the robot.

Figures 6A, 6B:
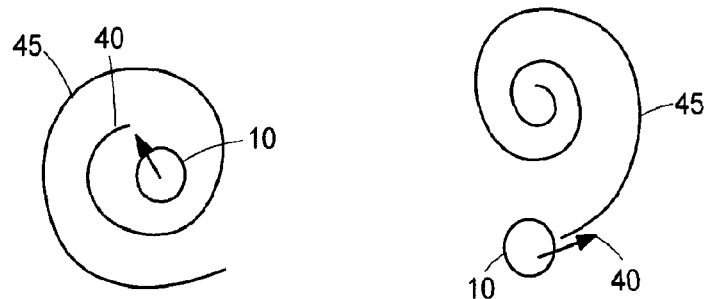
FIG. 6A is a schematic representation of the coverage pattern for a preferred embodiment of SPIRAL behavior.
FIG. 6B is a schematic representation of the coverage pattern for an alternative embodiment of SPIRAL behavior.

In a preferred embodiment, the method of achieving spot cleaning is a control algorithm providing outward spiral movement, or SPIRAL behavior, as shown in FIG. 6A. In general, spiral movement is generated by increasing the turning radius as a function of time. In a preferred embodiment, the robot 10 begins its spiral in a counter-clockwise direction, marked in FIG. 6A by movement line 45, in order to keep the dominant side on the outward, leading-edge of the spiral. In another embodiment, shown in FIG. 6B, spiral movement of the robot 10 is generated inward such that the radius of the turns continues to decrease. The inward spiral is shown as movement line 45 in FIG. 6B. It is not necessary, however, to keep the dominant side of the robot on the outside during spiral motion.

Figure 7:
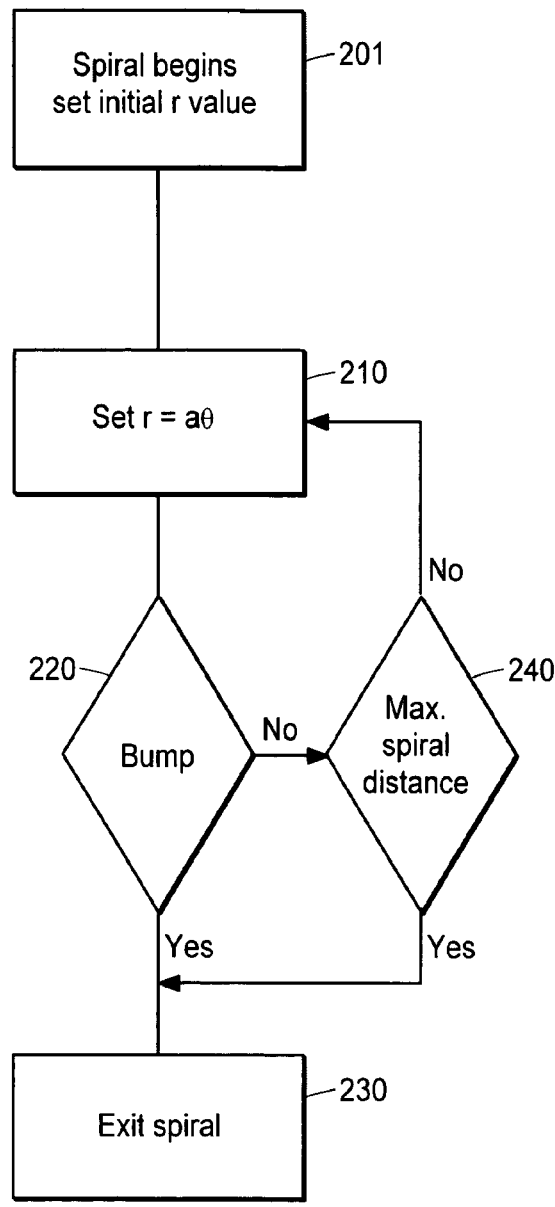
FIG. 7 is a flow-chart illustration of the spot-coverage algorithm of a preferred embodiment of the invention.

The method of spot cleaning used in a preferred embodiment—outward spiraling—is set forth in FIG. 7. Once the spiraling is initiated (step 201) and the value of r is set at its minimum, positive value (which will produce the tightest possible counterclockwise turn), the spiraling behavior recalculates the value of r as a function of •, where • represents the angular turning since the initiation of the spiraling behavior (step 210). By using the equation r=a•, where a is a constant coefficient, the tightness or desired overlap of the spiral can be controlled. (Note that • is not normalized to 2•). The value of a can be chosen by the equation $$a = \frac{d}{2};$$

where d is the distance between two consecutive passes of the spiral. For effective cleaning, a value for d should be chosen that is less than the width of the cleaning mechanism 30. In a preferred embodiment, a value of d is selected that is between one-half and two-thirds of the width of the cleaning head 30.

In other embodiments, the robot tracks its total distance traveled in spiral mode. The spiral will deteriorate after some distance, i.e. the centerpoint of the spiral motion will tend to drift over time due to surface dependant wheel slippage and/or inaccuracies in the spiral approximation algorithm and calculation precision. In certain embodiments, therefore, the robot may exit spiral mode after the robot has traveled a specific distance ("maximum spiral distance"), such as 6.3 or 18.5 meters (step 240). In a preferred embodiment, the robot uses multiple maximum spiral distances depending on whether the robot is performing an initial spiral or a later spiral. If the maximum spiral distance is reached without a bump, the robot gives control to a different behavior, and the robot, for example, then continues to move in a predominately straight line. (In a preferred embodiment, a STRAIGHT LINE behavior is a low priority, default behavior that propels the robot in an approximate straight line at a preset velocity of approximately 0.306 m/s when no other behaviors are active.

Figure 6C:
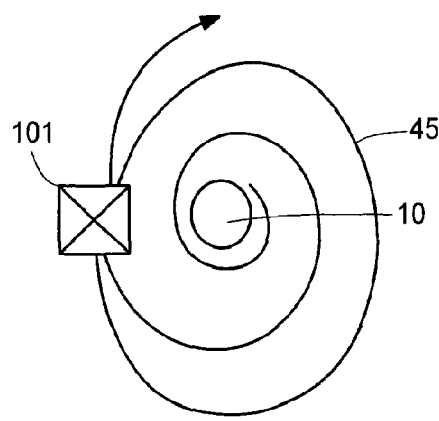
FIG. 6C is a schematic representation of the coverage pattern for yet another alternative embodiment of SPIRAL behavior.

In spiral mode, various actions can be taken when an obstacle is encountered. For example, the robot could (a) seek to avoid the obstacle and continue the spiral in the counter-clockwise direction, (b) seek to avoid the obstacle and continue the spiral in the opposite direction (e.g. changing from counter-clockwise to clockwise), or (c) change operational modes. Continuing the spiral in the opposite direction is known as reflective spiraling and is represented in FIG. 6C, where the robot 10 reverses its movement path 45 when it comes into contact with obstacle 101. In a preferred embodiment, as detailed in step 220, the robot 10 exits spot cleaning mode upon the first obstacle encountered by a bump sensor 12 or 13.

While a preferred embodiment describes a spiral motion for spot coverage, any self-bounded area can be used, including but not limited to regular polygon shapes such as squares, hexagons, ellipses, etc.

Operational Mode: Wall/Obstacle Following

Wall following or, in the case of a cleaning robot, edge cleaning, allows the user to clean only the edges of a room or the edges of objects within a room. The user places the robot 10 on the floor near an edge to be cleaned and selects the edge-cleaning operational mode. The robot 10 then moves in such a way that it follows the edge and cleans all areas brought into contact with the cleaning head 30 of the robot.

Figure 8A:
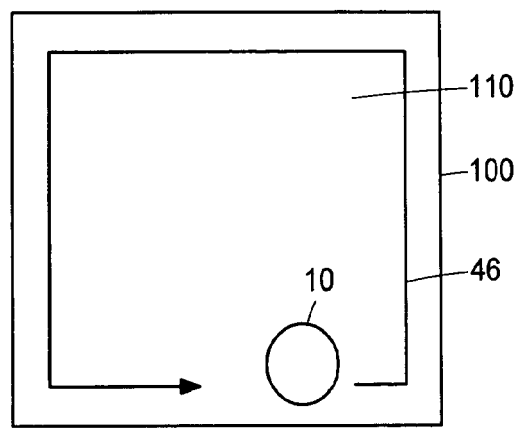
FIGS. 8A & 8B are schematic representations of the coverage pattern for a preferred embodiment of operation in obstacle following mode.
Figure 8B:
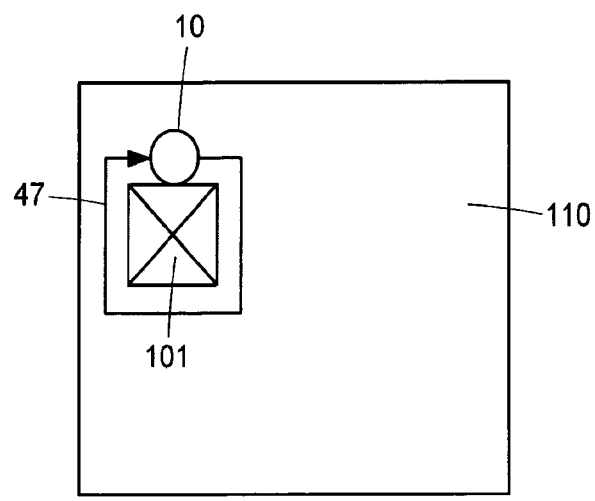

The movement of the robot 10 in a room 110 is shown in FIG. 8A, 8B. In FIG. 8A, the robot 10 is placed along wall 100, with the robot's dominant side next to the wall. The robot then runs along the wall indefinitely following movement path 46. Similarly, in FIG. 8B, the robot 10 is placed in the proximity of an obstacle 101. The robot then follows the edge of the obstacle 101 indefinitely following movement path 47.

In a preferred embodiment, in the wall-following mode, the robot uses the wall-following sensor 16 to position itself a set distance from the wall. The robot then proceeds to travel along the perimeter of the wall. As shown in FIGS. 8A & 8B, in a preferred embodiment, the robot 10 is not able to distinguish between a wall 100 and another solid obstacle 101.

Figure 9A:
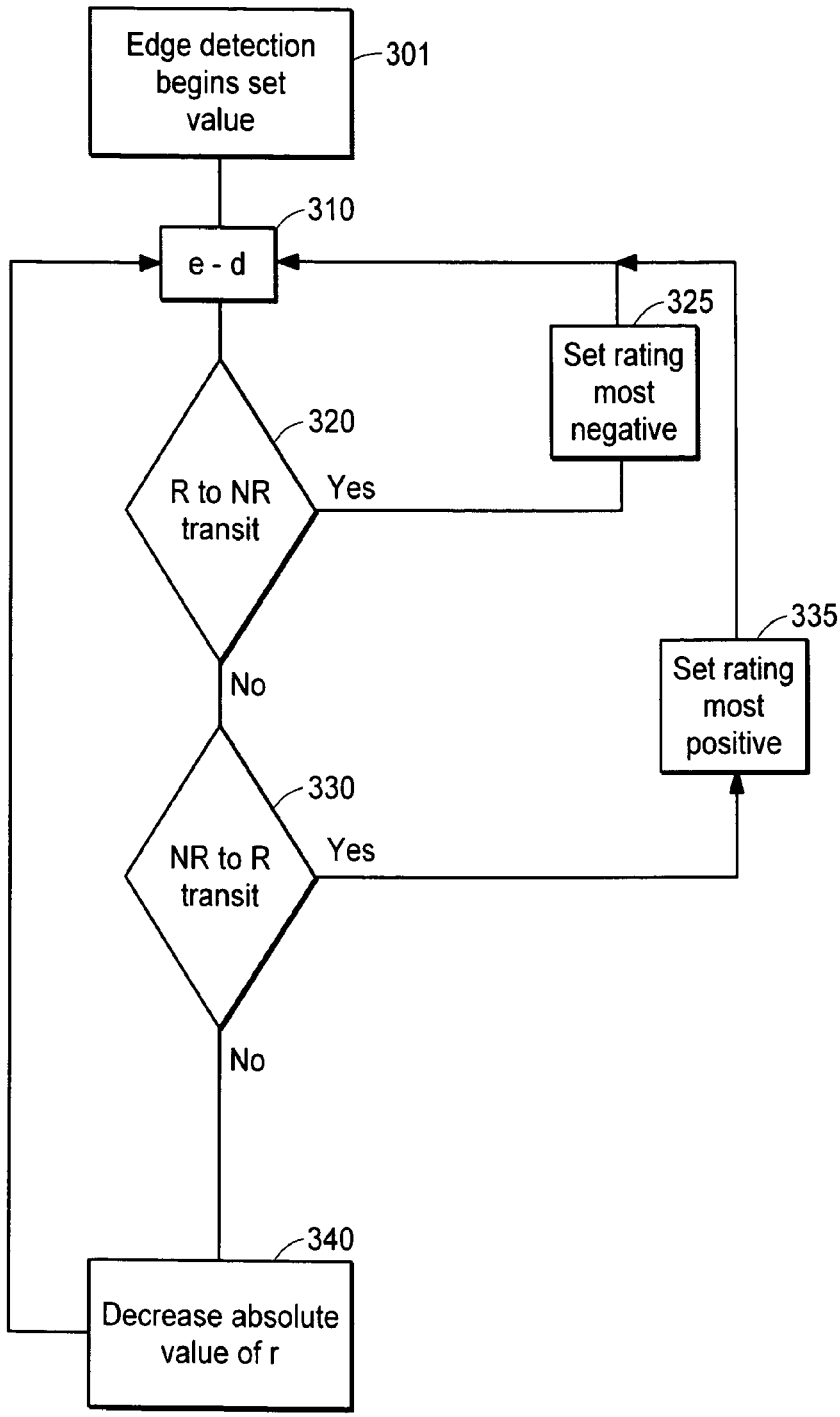
FIG. 9A is a flow-chart illustration of the obstacle following algorithm of a preferred embodiment of the invention.

The method used in a preferred embodiment for following the wall is detailed in FIG. 9A and provides a smooth wall following operation even with a one-bit sensor. (Here the one-bit sensor detects only the presence or absence of the wall within a particular volume rather than the distance between wall and sensor.) Other methods of detecting a wall or object can be used such as bump sensing or sonar sensors.

Once the wall-following operational mode, or WALL FOLLOWING behavior of a preferred embodiment, is initiated (step 301), the robot first sets its initial value for the steering at $r_0$. The WALL-FOLLOWING behavior then initiates the emit-detect routine in the wall-follower sensor 16 (step 310). The existence of a reflection for the IR transmitter portion of the sensor 16 translates into the existence of an object within a predetermined distance from the sensor 16. The WALL-FOLLOWING behavior then determines whether there has been a transition from a reflection (object within range) to a non-reflection (object outside of range) (step 320). If there has been a transition (in other words, the wall is now out of range), the value of r is set to its most negative value and the robot will veer slightly to the right (step 325). The robot then begins the emit-detect sequence again (step 310). If there has not been a transition from a reflection to a non-reflection, the wall-following behavior then determines whether there has been a transition from non-reflection to reflection (step 330). If there has been such a transition, the value of r is set to its most positive value and the robot will veer slightly left (step 335).

In the absence of either type of transition event, the wall-following behavior reduces the absolute value of r (step 340) and begins the emit-detect sequence (step 310) anew. By decreasing the absolute value of r, the robot 10 begins to turn more sharply in whatever direction it is currently heading. In a preferred embodiment, the rate of decreasing the absolute value of r is a constant rate dependant on the distance traveled.

Figure 8C:
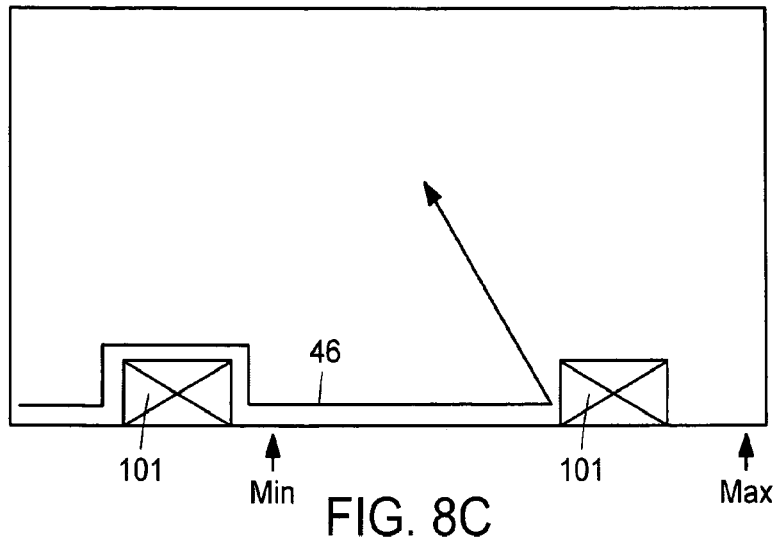
FIG. 8C is a schematic illustration of the termination of the obstacle following mode when an obstacle is encountered after the mobile robot has traveled a minimum distance.
Figure 8D:
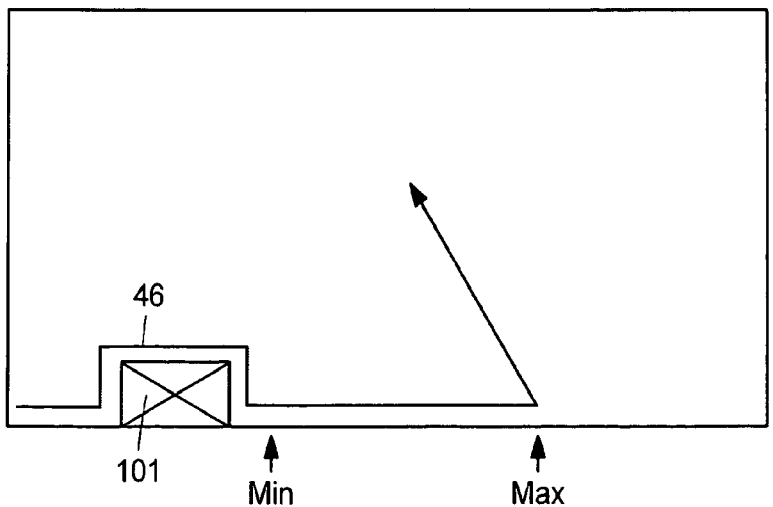
FIG. 8D is a schematic illustration of the termination of the obstacle following mode after the mobile robot has traveled a maximum distance.

The wall follower mode can be continued for a predetermined or random time, a predetermined or random distance or until some additional criteria are met (e.g. bump sensor is activated, etc.). In one embodiment, the robot continues to follow the wall indefinitely. In a preferred embodiment, as shown in FIGS. 8C & 8D wherein reference numeral 46 identifies the movement of the robot, minimum and maximum travel distances are determined, whereby the robot will remain in WALL-FOLLOWING behavior until the robot has either traveled the maximum distance (FIG. 8D) or traveled at least the minimum distance and encountered an obstacle 101 (FIG. 8C). This implementation of WALL-FOLLOWING behavior ensures the robot spends an appropriate amount of time in WALL-FOLLOWING behavior as compared to its other operational modes, thereby decreasing systemic neglect and distributing coverage to all areas. By increasing wall following, the robot is able to move in more spaces, but the robot is less efficient at cleaning any one space. In addition, by tending to exit WALL-FOLLOWING behavior after obstacle detection, the robot increases its perceived effectiveness.

Figure 9B:
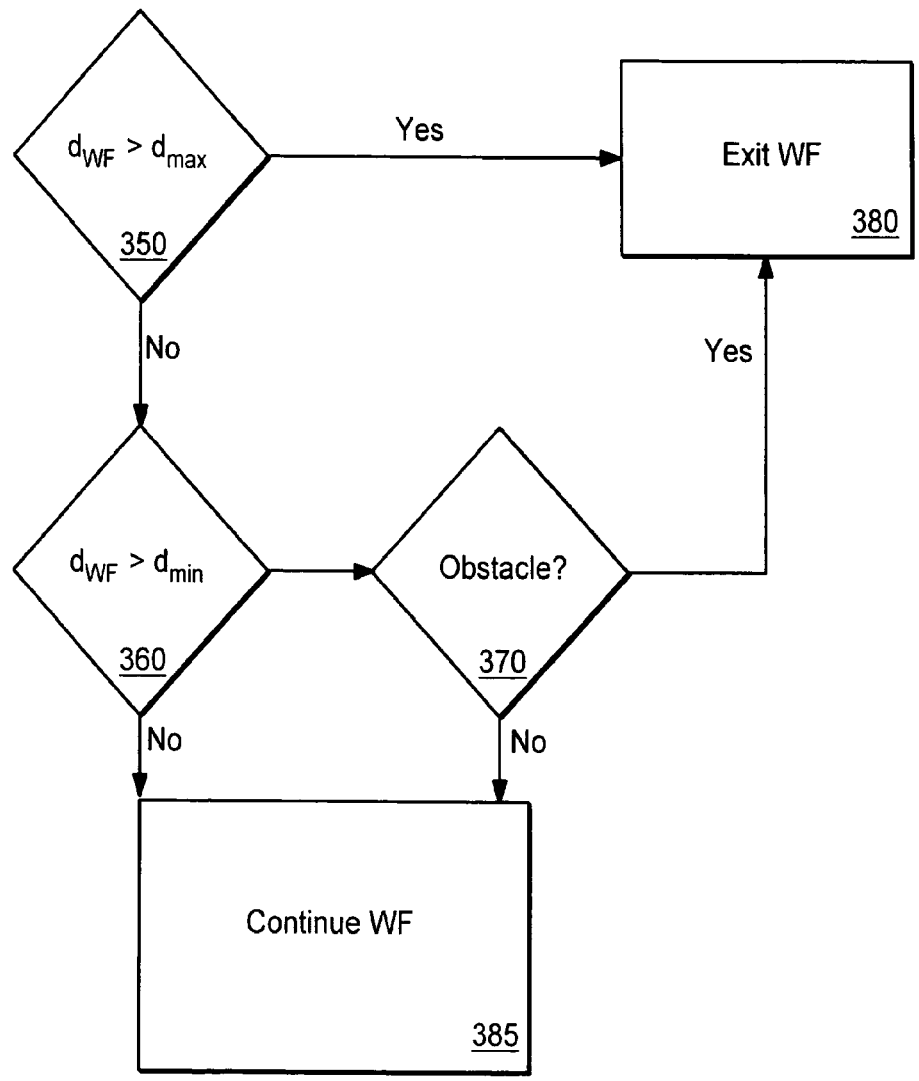
FIG. 9B is a flow-chart illustration of a preferred algorithm for determining when to exit obstacle following mode.

FIG. 9B is a flow-chart illustration showing this embodiment of determining when to exit WALL-FOLLOWING (WF) behavior. The robot first determines the minimum distance to follow the wall ($d_{min}$) and the maximum distance to follow the wall ($d_{max}$). While in wall (or obstacle) following mode, the control system tracks the distance the robot has traveled in that mode ($d_{WF}$). If $d_{WF}$ is greater than $d_{max}$ (step 350), then the robot exits wall-following mode (step 380). If, however, $d_{WF}$ is less than $d_{max}$ (step 350) and $d_{WF}$ is less than $d_{min}$ (step 360), the robot remains in wall-following mode (step 385). If $d_{WF}$ is greater than $d_{min}$ (step 360) and an obstacle is encountered (step 370), the robot exits wall-following mode (step 380).

Theoretically, the optimal distance for the robot to travel in WALL-FOLLOWING behavior is a function of room size and configuration and robot size. In a preferred embodiment, the minimum and maximum distances to remain in WALL-FOLLOWING are set based upon the approximate room size, the robots width and a random component, where by the average minimum travel distance is $2w/p$, where w is the width of the work element of the robot and p is the probability that the robot will enter WALL-FOLLOWING behavior in a given interaction with an obstacle. By way of example, in a preferred embodiment, w is approximately between 15 cm and 25 cm, and p is 0.095 (where the robot encounters 6 to 15 obstacles, or an average of 10.5 obstacles, before entering an obstacle following mode). The minimum distance is then set randomly as a distance between approximately 115 cm and 350 cm; the maximum distance is then set randomly as a distance between approximately 170 cm and 520 cm. In certain embodiments the ratio between the minimum distance to the maximum distance is 2:3. For the sake of perceived efficiency, the robot's initial operation in a obstacle following mode can be set to be longer than its later operations in obstacle following mode. In addition, users may place the robot along the longest wall when starting the robot, which improves actual as well as perceived coverage.

The distance that the robot travels in wall following mode can also be set by the robot depending on the number and frequency of objects encountered (as determined by other sensors), which is a measure of room "clutter". If more objects are encountered, the robot would wall follow for a greater distance in order to get into all the areas of the floor. Conversely, if few obstacles are encountered, the robot would wall follow less in order to not over-cover the edges of the space in favor of passes through the center of the space. An initial wall-following distance can also be included to allow the robot to follow the wall a longer or shorter distance during its initial period where the WALL-FOLLOWING behavior has control.

In a preferred embodiment, the robot may also leave wall-following mode if the robot turns more than, for example, 270 degrees and is unable to locate the wall (or object) or if the robot has turned a total of 360 degrees since entering wall-following mode.

In certain embodiments, when the WALL-FOLLOWING behavior is active and there is a bump, the ALIGN behavior becomes active. The ALIGN behavior turns the robot counter-clockwise to align the robot with the wall. The robot always turns a minimum angle to avoid getting the robot into cycles of many small turns. After it has turned through its minimum angle, the robot monitors its wall sensor and if it detects a wall and then the wall detection goes away, the robot stops turning. This is because at the end of the wall follower range, the robot is well aligned to start WALL-FOLLOWING. If the robot has not seen its wall detector go on and then off by the time it reaches its maximum angle, it stops anyway. This prevents the robot from turning around in circles when the wall is out of range of its wall sensor. When the most recent bump is within the side 60 degrees of the bumper on the dominant side, the minimum angle is set to 14 degrees and the maximum angle is 19 degrees. Otherwise, if the bump is within 30 degrees of the front of the bumper on the dominant side or on the non-dominant side, the minimum angle is 20 degrees and the maximum angle is 44 degrees. When the ALIGN behavior has completed turning, it cedes control to the WALL-FOLLOWING behavior.

Operational Mode: Room Coverage

The third operational mode is here called room-coverage or room cleaning mode, which allows the user to clean any area bounded by walls, stairs, obstacles or other barriers. To exercise this option, the user places the robot on the floor and selects room-cleaning mode. The robot them moves about the room cleaning all areas that it is able to reach.

Figure 10:
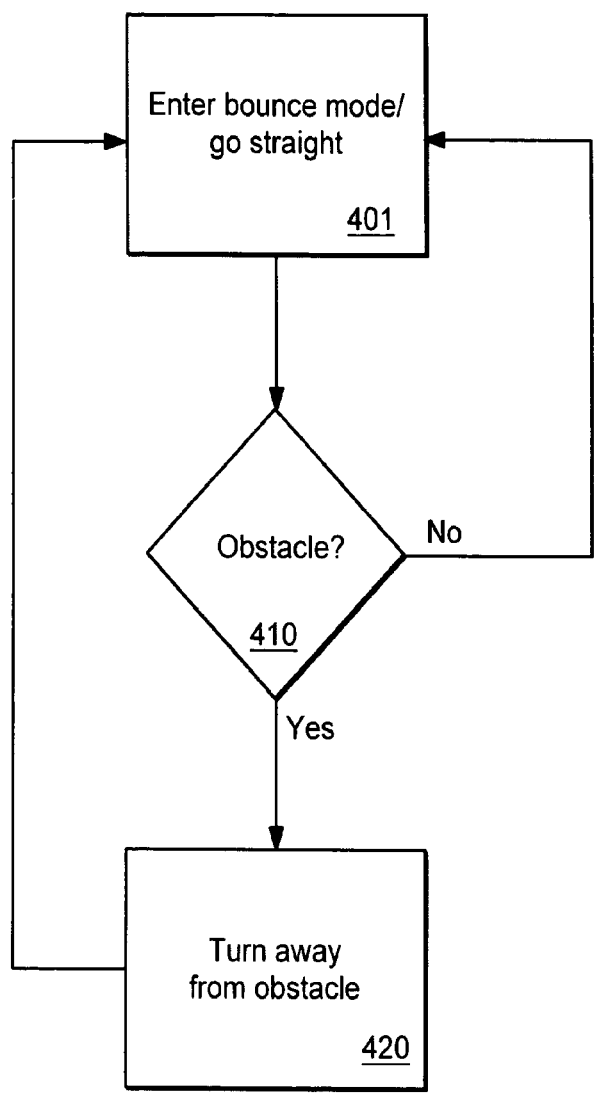
FIG. 10 is a schematic representation of the coverage pattern for a preferred embodiment of BOUNCE behavior.
Figure 11:
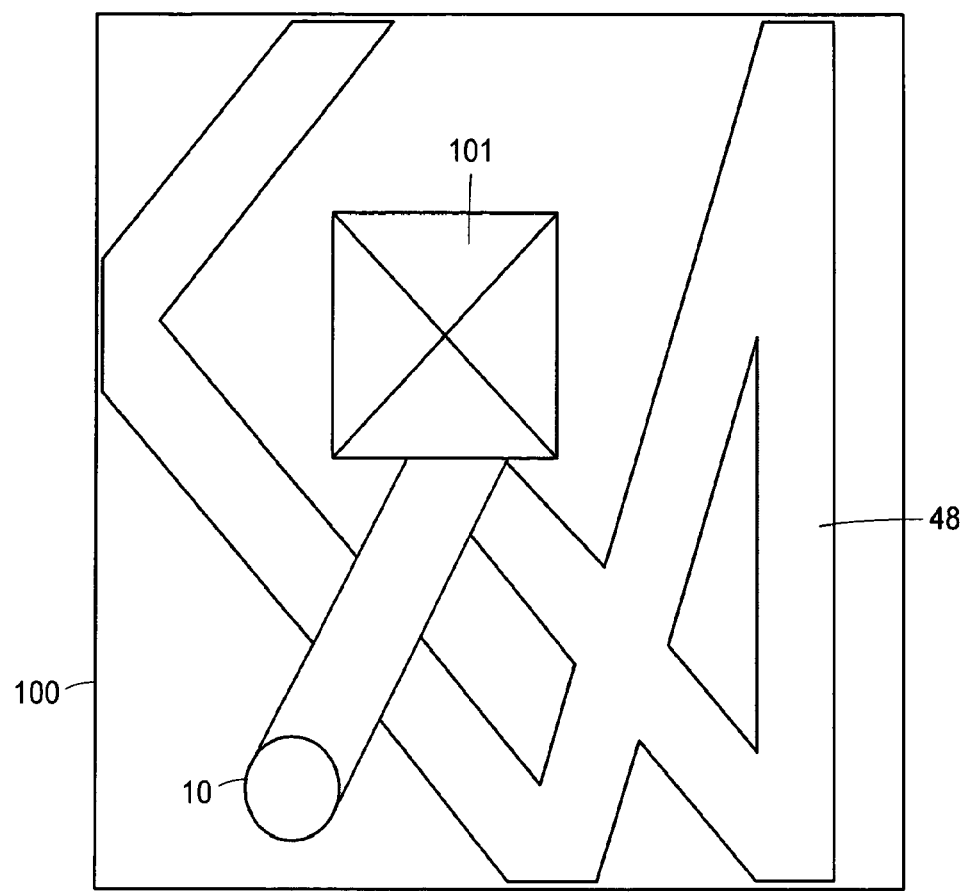
FIG. 11 is a flow-chart illustration of the room coverage algorithm of a preferred embodiment of the invention.

In a preferred embodiment, the method of performing the room cleaning behavior is a BOUNCE behavior in combination with the STRAIGHT LINE behavior. As shown in FIG. 10, the robot 10 travels until a bump sensor 12 and/or 13 is activated by contact with an obstacle 101 or a wall 100 (see FIG. 11). The robot 10 then turns and continues to travel. A sample movement path is shown in FIG. 11 as line 48.

The algorithm for random bounce behavior is set forth in FIG. 10. The robot 10 continues its forward movement (step 401) until a bump sensor 12 and/or 13 is activated (step 410). The robot 10 then calculates an acceptable range of new directions based on a determination of which bump sensor or sensors have been activated (step 420). A determination is then made with some random calculation to choose the new heading within that acceptable range, such as 90 to 270 degrees relative to the object the robot encountered. The angle of the object the robot has bumped is determined as described above using the timing between the right and left bump sensors. The robot then turns to its new headings. In a preferred embodiment, the turn is either clockwise or counterclockwise depending on which direction requires the least movement to achieve the new heading. In other embodiments, the turn is accompanied by movement forward in order to increase the robot's coverage efficiency.

The statistics of the heading choice made by the robot can be distributed uniformly across the allowed headings, i.e. there is an equivalent chance for any heading within the acceptable range. Alternately we can choose statistics based on a Gaussian or other distribution designed to preferentially drive the robot perpendicularly away from a wall.

In other embodiments, the robot could change directions at random or predetermined times and not based upon external sensor activity. Alternatively, the robot could continuously make small angle corrections based on long range sensors to avoid even contacting an object and, thereby cover the surface area with curved paths In a preferred embodiment, the robot stays in room-cleaning mode until a certain number of bounce interactions are reached, usually between 6 and 13.

2. Escape Behaviors

There are several situations the robot may encounter while trying to cover an area that prevent or impede it from covering all of the area efficiently. A general class of sensors and behaviors called escape behaviors are designed to get the robot out of these situations, or in extreme cases to shut the robot off if it is determined it cannot escape. In order to decide whether to give an escape behavior priority among the various behaviors on the robot, the robot determines the following: (1) is an escape behavior needed; (2) if yes, which escape behavior is warranted?

By way of example, the following situations illustrate situations where an escape behavior is needed for an indoor cleaning robot and an appropriate behavior to run:

(i) Situation 1. The robot detects a situation where it might get stuck—for example, a high spot in a carpet or near a lamp base that acts like a ramp for the robot. The robot performs small "panic" turn behaviors to get out of the situation;

(ii) Situation 2. The robot is physically stuck—for example, the robot is wedged under a couch or against a wall, tangled in cords or carpet tassels, or stuck on a pile of electrical cords with its wheels spinning. The robot performs large panic turn behaviors and turns off relevant motors to escape from the obstruction;

(iii) Situation 3. The robot is in a small, confined area—for example, the robot is between the legs of a chair or in the open area under a dresser, or in a small area created by placing a lamp close to the corner of a room. The robot edge follows using its bumper and/or performs panic turn behaviors to escape from the area; and (iv) Situation 4. The robot has been stuck and cannot free itself—for example, the robot is in one of the cases in category (ii), above, and has not been able to free itself with any of its panic behaviors. In this case, the robot stops operation and signals to the user for help. This preserves battery life and prevents damage to floors or furniture.

In order to detect the need for each escape situation, various sensors are used. For example:

(i) Situation 1. (a) When the brush or side brush current rise above a threshold, the voltage applied to the relevant motor is reduced. Whenever this is happening, a stall rate variable is increased. When the current is below the threshold, the stall rate is reduced. If the stall level rises above a low threshold and the slope of the rate is positive, the robot performs small panic turn behaviors. It only repeats these small panic turn behaviors when the level has returned to zero and risen to the threshold again. (b) Likewise, there is a wheel drop level variable which is increased when a wheel drop event is detected and is reduced steadily over time. When a wheel drop event is detected and the wheel drop level is above a threshold (meaning there have been several wheel drops recently), the robot performs small or large panic turn behaviors depending on the wheel drop level.

(ii) Situation 2. (a) When the brush stall rate rises above a high threshold and the slope is positive, the robot turns off the brush for 13 seconds and performs large panic turn behaviors at 1, 4, and 7 seconds. At the end of the 13 seconds, the brush is turned back on. (b) When the drive stall rate rises above a medium threshold and the slope is positive, the robot performs large panic turn behaviors continuously. (c) When the drive stall rate rises above a high threshold, the robot turns off all of the motors for 15 seconds. At the end of the 15 seconds, the motors are turned back on. (d) When the bumper of the robot is held in constantly for 5 seconds (as in a side wedging situation), the robot performs a large panic turn behavior. It repeats the panic turn behavior every 5 seconds until the bumper is released. (e) When the robot has gotten no bumps for a distance of 20 feet, it assumes that it might be stuck with its wheels spinning. To free itself, it performs a spiral. If has still not gotten a bump for 10 feet after the end of the spiral, performs a large panic turn behavior. It continues this every 10 feet until it gets a bump.

(iii) Situation 3. (a) When the average distance between bumps falls below a low threshold, the robot performs edge following using its bumper to try to escape from the confined area. (b) When the average distance between bumps falls below a very low threshold, the robot performs large panic turn behaviors to orient it so that it may better be able to escape from the confined area.

(iv) Situation 4. (a) When the brush has stalled and been turned off several times recently and the brush stall rate is high and the slope is positive, the robot shuts off. (b) When the drive has stalled and the motors turned off several times recently and the drive stall rate is high and the slope is positive, the robot shuts off. (c) When any of the wheels are dropped continuously for greater than 2 seconds, the robot shuts off. (d) When many wheel drop events occur in a short time, the robot shuts off. (e) When any of the cliff sensors sense a cliff continuously for 10 seconds, the robot shuts off. (f) When the bump sensor is constantly depressed for a certain amount of time, for example 10 seconds, it is likely that the robot is wedged, and the robot shuts off.

Figure 12A:
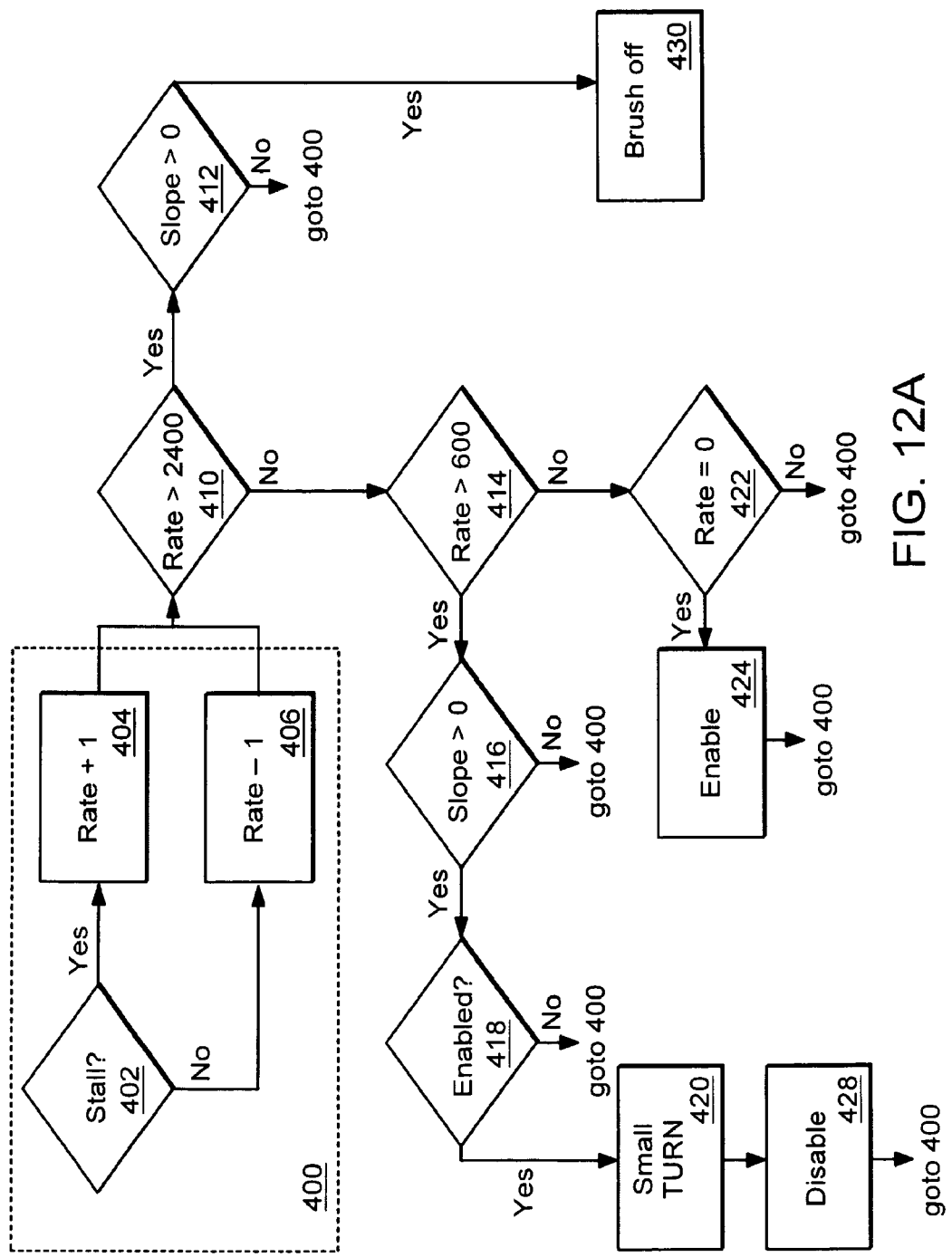
FIGS. 12A & 12B are flow-chart illustrations of an exemplary escape behavior.
Figure 12B:
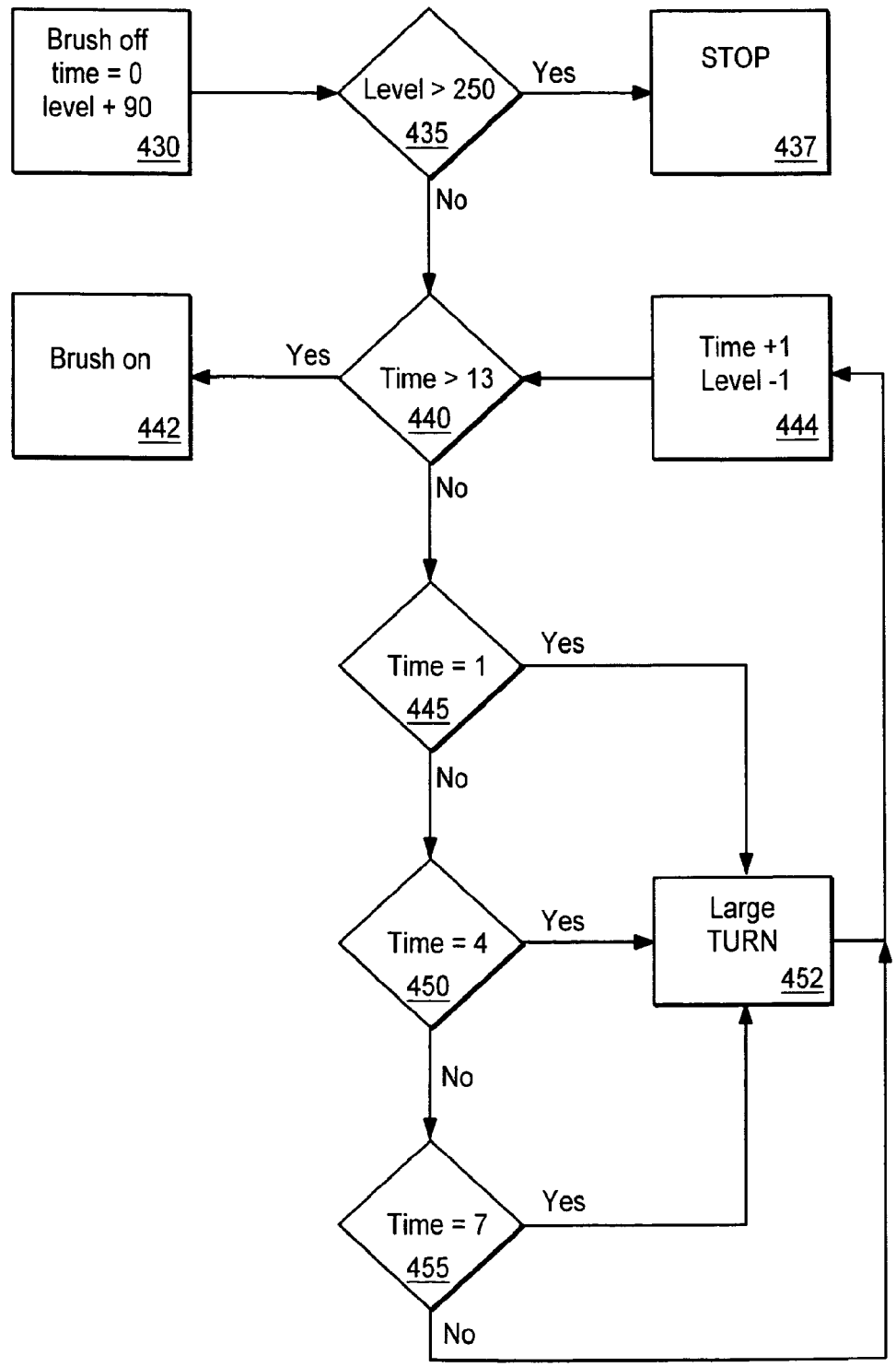

As a descriptive example, FIGS. 12A & 12B illustrate the analysis used in a preferred embodiment for identifying the need for an escape behavior relative to a stalled brush motor, as described above in Situations 1, 2 and 4. Each time the brush current exceeds a given limit for the brush motor (step 402), a rate register is incremented by 1 (step 404); if no limit is detected, the rate register is decremented by 1 (step 406). A separate slope register stores the recent values for a recent time period such as 120 cycles. If the rate is above 600 (where 600 corresponds to one second of constant stall) (step 414) and the slope is positive (step 416), then the robot will run an escape behavior (step 420) if the escape behavior is enabled (step 418). The escape behaviors are disabled after running (step 428) until the rate has returned to zero (step 422), re-enabled (step 424) and risen to 600 again. This is done to avoid the escape behavior being triggered constantly at rates above 600.

If, however, the rate is above 2400 (step 410) and the slope is positive (step 412), the robot will run a special set of escape behaviors, shown in FIG. 12B. In a preferred embodiment, the brush motor will shut off (step 430), the "level" is incremented by a predetermined amount (50 to 90) (step 430), the stall time is set (step 430), and a panic behavior (step 452) is performed at 1 second (step 445), 4 seconds (step 450) and 7 seconds (step 455) since the brush shut off. The control system then restarts the brush at 13 seconds (steps 440 & 442). Level is decremented by 1 every second (steps 444). If level reaches a maximum threshold (step 435), the robot ceases all operation (step 437). In addition, the robot may take additional actions when certain stalls are detected, such as limiting the voltage to the motor to prevent damage to the motor.

A preferred embodiment of the robot has four escape behaviors: TURN, EDGE, WHEEL DROP and SLOW.

TURN. The robot turns in place in a random direction, starting at a higher velocity (approximately twice of its normal turning velocity) and decreasing to a lower velocity (approximately one-half of its normal turning velocity). Varying the velocity may aid the robot in escaping from various situations. The angle that the robot should turn can be random or a function of the degree of escape needed or both. In a preferred embodiment, in low panic situations the robot turns anywhere from 45 to 90 degrees, and in high panic situations the robot turns anywhere from 90 to 270 degrees.

EDGE. The robot follows the edge using its bump sensor until (a) the robot turns 60 degrees without a bump or (b) the robot cumulatively has turned more than 170 degrees since the EDGE behavior initiated. The EDGE behavior may be useful if the average bump distance is low (but not so low as to cause a panic behavior). The EDGE behavior allows the robot to fit through the smallest openings physically possible for the robot and so can allow the robot to escape from confined areas.

WHEEL DROP. The robot back drives wheels briefly, then stops them. The back driving of the wheels helps to minimize false positive wheel drops by giving the wheels a small kick in the opposite direction. If the wheel drop is gone within 2 seconds, the robot continues normal operation.

SLOW. If a wheel drop or a cliff detector goes off, the robot slows down to speed of 0.235 m/s (or 77% of its normal speed) for a distance of 0.5 m and then ramps back up to its normal speed.

In addition to the coverage behaviors and the escape behaviors, the robot also might contain additional behaviors related to safety or usability. For example, if a cliff is detected for more than a predetermined amount of time, the robot may shut off. When a cliff is first detected, a cliff avoidance response behavior takes immediate precedence over all other behaviors, rotating the robot away from the cliff until the robot no longer senses the cliff. In a preferred embodiment, the cliff detection event does not cause a change in operational modes. In other embodiments, the robot could use an algorithm similar to the wall-following behavior to allow for cliff following.

The individual operation of the three operational modes has been described above; we now turn to the preferred mode of switching between the various modes.

In order to achieve the optimal coverage and cleaning efficiency, a preferred embodiment uses a control program that gives priority to various coverage behaviors. (Escape behaviors, if needed, are always given a higher priority.) For example, the robot 10 may use the wall following mode for a specified or random time period and then switch operational modes to the room cleaning. By switching between operational modes, the robotic device of the present invention is able to increase coverage, cleaning efficiency and perceived effectiveness.

Figure 13A:
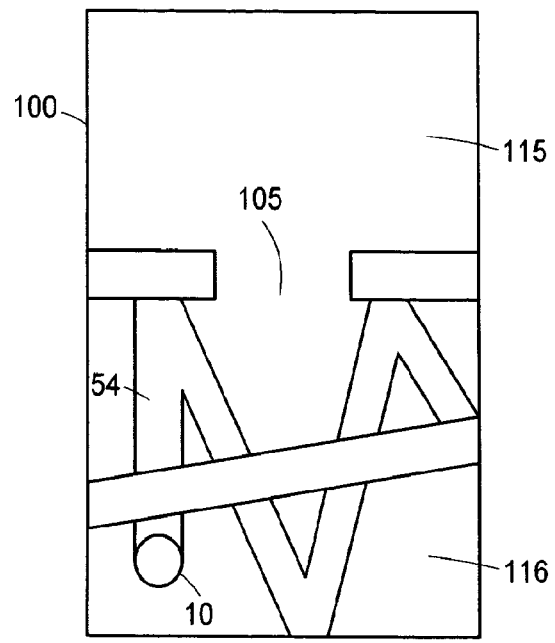
FIG. 13A is a schematic representation of the coverage pattern of a mobile robot with only a single operational mode.
Figure 13B:
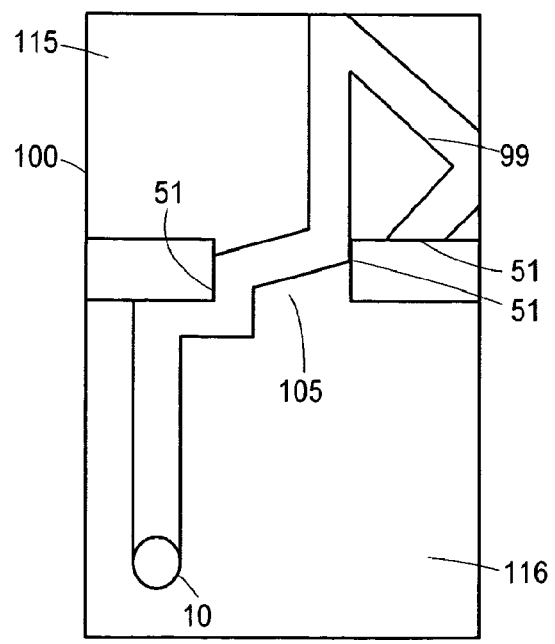
FIG. 13B is a schematic representation of the coverage pattern for a preferred embodiment of the instant invention using obstacle following and room coverage modes.

By way of example, FIGS. 13A & 13B show a mobile robot 10 in a "dog bone" shaped environment in which two rooms 115 & 116 of roughly equal dimensions are connected by a narrow passageway 105. (This example illustrates the robot diffusion problem discussed earlier.) This arrangement is a simplified version of typical domestic environments, where the "dog bone" may be generated by the arrangements of obstacles within the room. In FIG. 13A, the path of robot 10 is traced as line 54 as robot 10 operates on in random bounce mode. The robot 10 is unable to move from room 116 into 115 during the limited run because the robot's random behavior did not happen to lead the robot through passageway 105. This method leaves the coverage far less than optimal and the cleaning rate decreased due to the number of times the robot 10 crosses its own path.

FIG. 13B shows the movement of a preferred embodiment of robot 10, whereby the robot cycles between BOUNCE and WALL FOLLOWING behaviors. As the robot follows path 99, each time the robot 10 encounters a wall 100, the robot follows the wall for a distance equal to twice the robot's diameter. The portions of the path 99 in which the robot 10 operates in wall following mode are labeled 51. This method provides greatly increased coverage, along with attendant increases in cleaning rate and perceived effectiveness.

Figure 14:
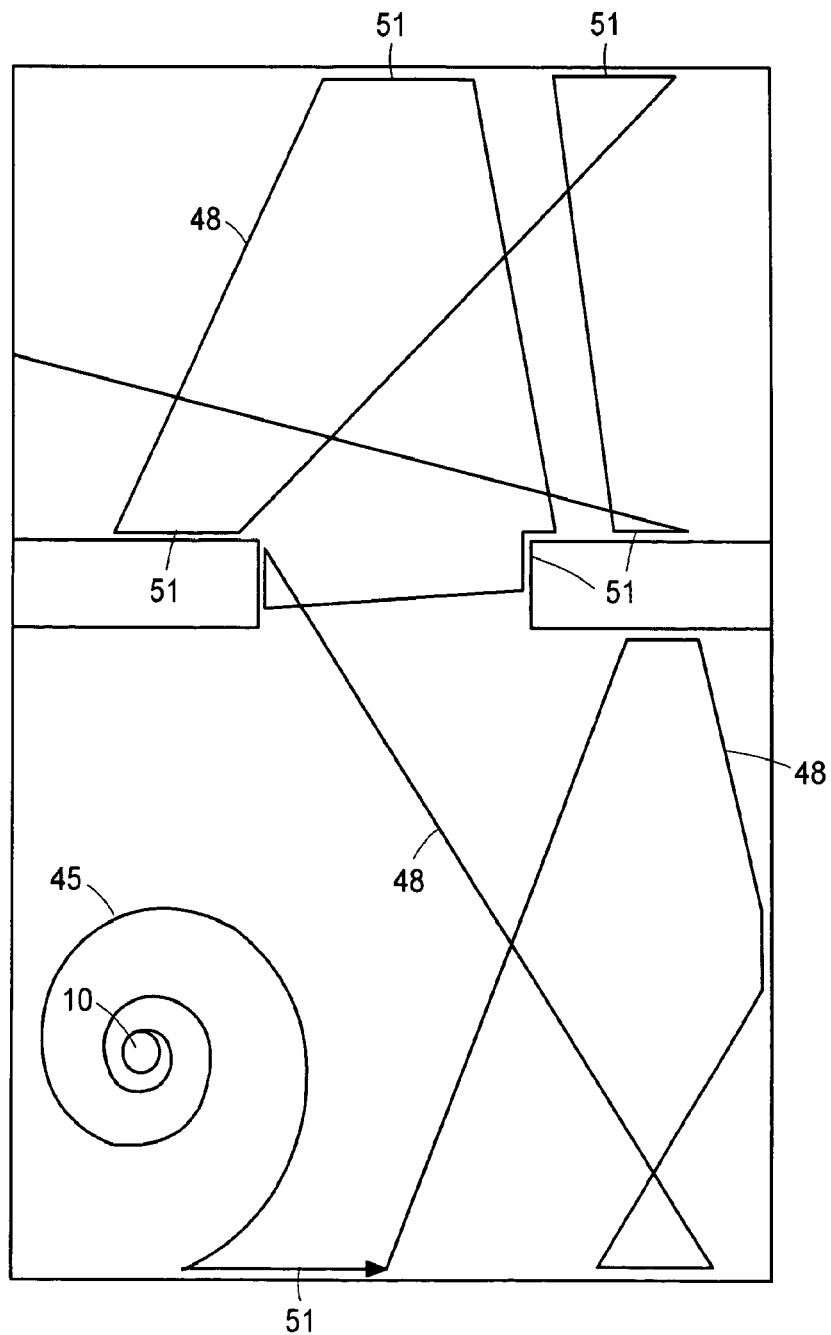
FIG. 14 is a schematic representation of the coverage pattern for a preferred embodiment of the instant invention using spot-coverage, obstacle following and room coverage modes.

Finally, a preferred embodiment of the present invention is detailed in FIG. 14, in which all three operational modes are used. In a preferred embodiment, the device 10 begins in spiral mode (movement line 45). If a reflective spiral pattern is used, the device continues in spiral mode until a predetermined or random number of reflective events has occurred. If a standard spiral is used (as shown in FIG. 14), the device should continue until any bump sensor event. In a preferred embodiment, the device immediately enters wall following mode after the triggering event.

In a preferred embodiment, the device then switches between wall following mode (movement lines 51) and random bounce modes (movement lines 48) based on bump sensor events or the completion of the wall following algorithm. In one embodiment, the device does not return to spiral mode; in other embodiments, however, the device can enter spiral mode based on a predetermined or random event.

In a preferred embodiment, the robot keeps a record of the average distance traveled between bumps. The robot then calculates an average bump distance (ABD) using the following formula: (¾×ABD)+(¼×most recent distance between bumps). If the ABD is a above a predetermined threshold, the robot will again give priority to the SPIRAL behavior. In still other embodiments, the robot may have a minimum number of bump events before the SPIRAL behavior will again be given priority. In other embodiments, the robot may enter SPIRAL behavior if it travels a maximum distance, for example 20 feet, without a bump event.

In addition, the robot can also have conditions upon which to stop all operations. For example, for a given room size, which can be manually selected, a minimum and maximum run time are set and a minimum total distance is selected. When the minimum time and the minimum distance have been reached the robot shuts off. Likewise, if the maximum time has been reached, the robot shuts off.

Of course, a manual control for selecting between operational modes can also be used. For example, a remote control could be used to change or influence operational modes or behaviors. Likewise, a switch mounted on the shell itself could be used to set the operation mode or the switching between modes. For instance, a switch could be used to set the level of clutter in a room to allow the robot a more appropriate coverage algorithm with limited sensing ability.

One of skill in the art will recognize that portions of the instant invention can be used in autonomous vehicles for a variety of purposes besides cleaning. The scope of the invention should be determined by the appended claims and their legal equivalents, rather than by the examples given.

We claim:

1. A mobile robot comprising:
    a drive mechanism that both drives the robot forward in a drive direction and turns the robot to change the drive direction;
    a floor cleaner disposed on a first lateral side of the robot, transverse to the drive direction;
    a forward obstacle sensor system responsive to objects encountered by the robot while moving in the drive direction, the forward obstacle sensor system comprising first and second obstacle sensors disposed on a forward portion of the robot, wherein the first obstacle sensor is disposed on the first lateral side of the robot and the second obstacle sensor is disposed on an opposite, second lateral side of the robot with respect to the drive direction;
    a side sensor positioned to detect proximity of objects on the first lateral side of the robot, transverse to the drive direction; and
    a drive controller that controls the drive mechanism to turn the robot;
    wherein the drive controller is configured to, in response to detecting an object by the forward obstacle sensor system proximate the forward portion of the robot, determine an approximate angle at which the detected object was encountered by the robot, and when the angle is on the second lateral side of the robot with respect to the drive direction, turn the robot to position the floor cleaner substantially adjacent the detected object while monitoring with the side sensor proximity of the object on the first lateral side of the robot, and then drive the robot in the drive direction to follow the detected object proximate the first lateral side with the floor cleaner substantially adjacent the detected object.

2. The mobile robot of claim 1, wherein the floor cleaner includes a side brush extending beyond a lateral extent of a housing of the robot, the side brush arranged to sweep debris from beyond a perimeter of the robot for collection by the robot.

3. The mobile robot of claim 2, wherein the forward obstacle sensor system and the side sensor are both responsive to walls, and wherein the drive controller, in response to the forward sensor system detecting a wall in the drive direction, turns the robot until the detected wall is detected on the first lateral side of the robot, and then drives the robot to keep the detected wall on the first lateral side of the robot.

4. The mobile robot of claim 1, wherein the drive controller is further configured to
    drive the robot to follow an object detected on the first lateral side of the robot, by changing a turning radius to maintain detection of the sensed object by the side sensor; and
    upon detecting that the object is no longer proximate the first lateral side of the robot, to initiate a turn of the robot toward the first lateral side of the robot in accordance with a turning radius in response to detecting that the followed object is no longer proximate the first lateral side; and then to progressively decrease the turning radius of the robot over time while driving the robot forward, thereby causing the robot to turn more sharply until the robot encounters a change in sensory input.

5. The mobile robot of claim 1, wherein the drive controller determines that an object is no longer proximate the first lateral side of the robot upon transition of the side sensor from a reflection state to a non-reflection state.

6. The mobile robot of claim 1 wherein the drive controller is configured to drive the robot to turn in a spiral having a steadily increasing radius, such that the first lateral side of the robot is positioned on an outward edge of the spiral.

7. The mobile robot of claim 1, further comprising a bump sensor responsive to the robot bumping into an object in the drive direction, and wherein the drive controller, in response to the robot bumping into an object in the drive direction while the robot is following an object on the first lateral side of the robot, turns the robot away from the first lateral side of the robot through a first angle, stops turning the robot when the side sensor detects the bumped object, and then drives the robot forward in the drive direction, such that the robot tends to travel along the bumped object.

8. The mobile robot of claim 7, wherein the drive controller, in response to turning the robot away from the first lateral side of the robot through a turn angle larger than the first angle, without detecting the bumped object with the side sensor, stops turning the robot and then drives the robot forward in the drive direction.

9. A mobile robot comprising:
    a drive mechanism that both drives the robot forward across a floor in a drive direction and turns the robot to change the drive direction;
    a proximity sensor responsive to proximity of an object to be followed on a lateral side of the robot;
    a drive controller that controls the drive mechanism to turn the robot to follow the object on the lateral side of the robot, by changing a robot turning radius to maintain continuous detection of the object by the sensor, including turning the robot toward the lateral side in response to cessation of detection of the object proximate the lateral side; and
    a drive controller that controls the drive mechanism to turn the robot to follow the object on the lateral side of the robot, by changing a robot turning radius to maintain continuous detection of the object by the sensor, including turning the robot toward the lateral side in response to cessation of detection of the object proximate the lateral side;
    wherein the proximity sensor is configured to detect the proximity of an object located at an expected position approximately three inches ahead of a drive wheel of the drive mechanism in the drive direction, the proximity sensor comprising an emitter and a detector collimated so that a finite volume of intersection occurs at the expected position.

10. The mobile robot of claim 9, wherein the proximity sensor has a radial detection range of about 0.75 inches.

11. The mobile robot of claim 9, wherein the controller decreases the robot turning radius until the proximity sensor detects an object on the lateral side.

12. The mobile robot of claim 9, wherein the controller sets an initial turning radius and steadily decreases the turning radius until the robot bumps against an object.

13. The mobile robot of claim 9, wherein the sensor is responsive to proximity of a room wall, and wherein the controller drives the robot to follow a proximate wall on the lateral side of the robot by changing a turning radius to maintain continuous detection of the wall by the sensor, including turning the robot toward the lateral side while decreasing the turning radius of the robot in response to cessation of detection of the wall proximate the lateral side.

14. The mobile robot of claim 9, wherein the proximity sensor comprises a one bit sensor for indicating the presence or absence of an object.

15. The mobile robot of claim 9, further comprising a work element defining a work width, and wherein the work width is approximately between 15 centimeters and 25 centimeters.

16. The mobile robot of claim 9, wherein the robot comprises a circular chassis supporting the drive mechanism, the proximity sensor, and the drive controller, and wherein the drive controller is configured to control the drive mechanism to follow an object on the lateral side of the robot using the proximity sensor for a distance equal to approximately twice the diameter of the chassis.

* * * * *

UNITED STATES PATENT AND TRADEMARK OFFICE
CERTIFICATE OF CORRECTION

PATENT NO.        : 8,463,438 B2  
APPLICATION NO.   : 12/609124  
DATED             : June 11, 2013  
INVENTOR(S)       : Joseph L. Jones and Philip R. Mass It is certified that error appears in the above-identified patent and that said Letters Patent is hereby corrected as shown below:

In the claims

In claim 1, col. 17, line 35, delete "and" and insert --and,--

Signed and Sealed this
Tenth Day of December, 2013

Margaret A. Focarino
*Commissioner for Patents of the United States Patent and Trademark Office*